United States Patent
Sakamoto et al.

(10) Patent No.: US 10,554,787 B2
(45) Date of Patent: Feb. 4, 2020

(54) DISPLAY APPARATUS AND RECORDING MEDIUM

(71) Applicant: Sharp Kabushiki Kaisha, Sakai, Osaka (JP)

(72) Inventors: Kiho Sakamoto, Sakai (JP); Hiroki Munetomo, Sakai (JP); Noriyuki Koyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/009,348

(22) Filed: Jun. 15, 2018

(65) Prior Publication Data

US 2018/0367643 A1     Dec. 20, 2018

(30) Foreign Application Priority Data

Jun. 20, 2017 (JP) .................................. 2017-120698

(51) Int. Cl.
| H04L 29/08 | (2006.01) |
| G06F 3/0481 | (2013.01) |
| G06F 3/0484 | (2013.01) |
| G06F 3/0488 | (2013.01) |

(52) U.S. Cl.
CPC .......... *H04L 67/36* (2013.01); *G06F 3/04817* (2013.01); *G06F 3/04845* (2013.01); *G06F 3/04883* (2013.01)

(58) Field of Classification Search
CPC . H04L 67/36; G06F 3/04883; G06F 3/04845; G06F 3/04817
See application file for complete search history.

(56) References Cited

U.S. PATENT DOCUMENTS

| 2011/0283334 | A1* | 11/2011 | Choi | ................... G06F 3/04883 725/148 |
| 2012/0139951 | A1* | 6/2012 | Hwang | ............... G06F 3/04883 345/665 |

FOREIGN PATENT DOCUMENTS

| JP | 2013-003742 A | 1/2013 |
| JP | 2014-135578 A | 7/2014 |

OTHER PUBLICATIONS

JP-2013003742-A (Machine Translation on Nov. 16, 2018) (Year: 2013).*
JP-2014135578-A (Machine Translation on Nov. 16, 2018) (Year: 2014).*

* cited by examiner

*Primary Examiner* — Michael Le
(74) *Attorney, Agent, or Firm* — Keating & Bennett, LLP

(57) ABSTRACT

An image created based on content is displayed on a display screen. A selected image is selected from the image. A move operation is detected on the selected image. It is determined whether or not the selected image has been moved to a predetermined specified area on the display screen. The display form of the selected image is changed when the selected image has been moved to the specified area. Content corresponding to the selected image is transmitted to a transmission destination associated with the specified area.

8 Claims, 20 Drawing Sheets

DISPLAY APPARATUS AND RECORDING MEDIUM

BACKGROUND

1. Field

The present disclosure relates to a display apparatus and the like.

2. Description of the Related Art

Heretofore, a technique has been known in which various types of data are delivered between multiple apparatuses. For example, the following disclosure has been disclosed (for example, see Japanese Unexamined Patent Application Publication No. 2013-3742). A display unit displays an icon, which represents data, so that the icon may be moved in accordance with a user's touch operation. At the same time, the display unit displays, around the icon, pieces of apparatus specification information representing apparatuses to which the data may be transmitted. When a user has moved, using a touch operation, the icon that is displayed by the display unit, a touch sensor unit detects the direction in which the user has moved the icon. An apparatus-specification-information detecting unit detects apparatus specification information displayed in the direction detected by the touch sensor unit. A data reception/transmission controller controls transmission of the data to the apparatus indicated by the apparatus specification information detected by the apparatus-specification-information detecting unit.

The following disclosure has been disclosed (for example, see Japanese Unexamined Patent Application Publication No. 2014-135578). When an image management application is activated on the home screen, an image management screen is displayed on the display. On the image management screen, thumbnail icons corresponding to image data are displayed. When a user selects any thumbnail icon, share transmission icons (SH) are displayed based on data about addresses for which share transmission is enabled. In this state, the user flicks the selected thumbnail icon toward a share transmission icon, the image data corresponding to the thumbnail icon is transmitted based on the address data corresponding to the share transmission icon.

However, Japanese Unexamined Patent Application Publication No. 2013-3742 described above discloses a technique of detecting a peripheral in a short distance and transmitting data to the peripheral. In the disclosure, a peripheral has to be detected, failing to achieve an easy operation of transmitting content.

In Japanese Unexamined Patent Application Publication No. 2014-135578 described above, it is assumed that mail or the like is used as a transmission mechanism. For example, in transmission of displayed content to a different apparatus, a user may feel the usability is not good.

A data delivery mechanism of the related art has difficulty in that a user does not easily recognize whether or not content has been transmitted on the transmission side.

SUMMARY

The present disclosure provides a display apparatus and the like which achieve a user's visual recognition of an operation of transmitting content to a different apparatus, and also achieve high user operability.

A display apparatus provided by the present disclosure includes a display unit, a selection unit, a detection unit, a determination unit, a changing unit, and a transmission unit. The display unit displays an image on a display screen. The image is created based on content. The selection unit selects a selected image from the image. The detection unit detects a move operation on the selected image. The determination unit determines whether or not the selected image has been moved to a predetermined specified area on the display screen. The changing unit changes a display form of the selected image when the selected image has been moved to the specified area. The transmission unit transmits content to a transmission destination. The content corresponds to the selected image whose display form has been changed. The transmission destination is associated with the specified area.

A non-transitory computer readable medium provided by the present disclosure stores a program causing a computer to execute a process including displaying an image on a display screen, the image being created based on content; selecting a selected image from the image; detecting a move operation on the selected image; determining whether or not the selected image has been moved to a predetermined specified area on the display screen; changing a display form of the selected image when the selected image has been moved to the specified area; and transmitting content to a transmission destination, the content corresponding to the selected image whose display form has been changed, the transmission destination being associated with the specified area.

DESCRIPTION OF THE EMBODIMENTS

Figure 1A:
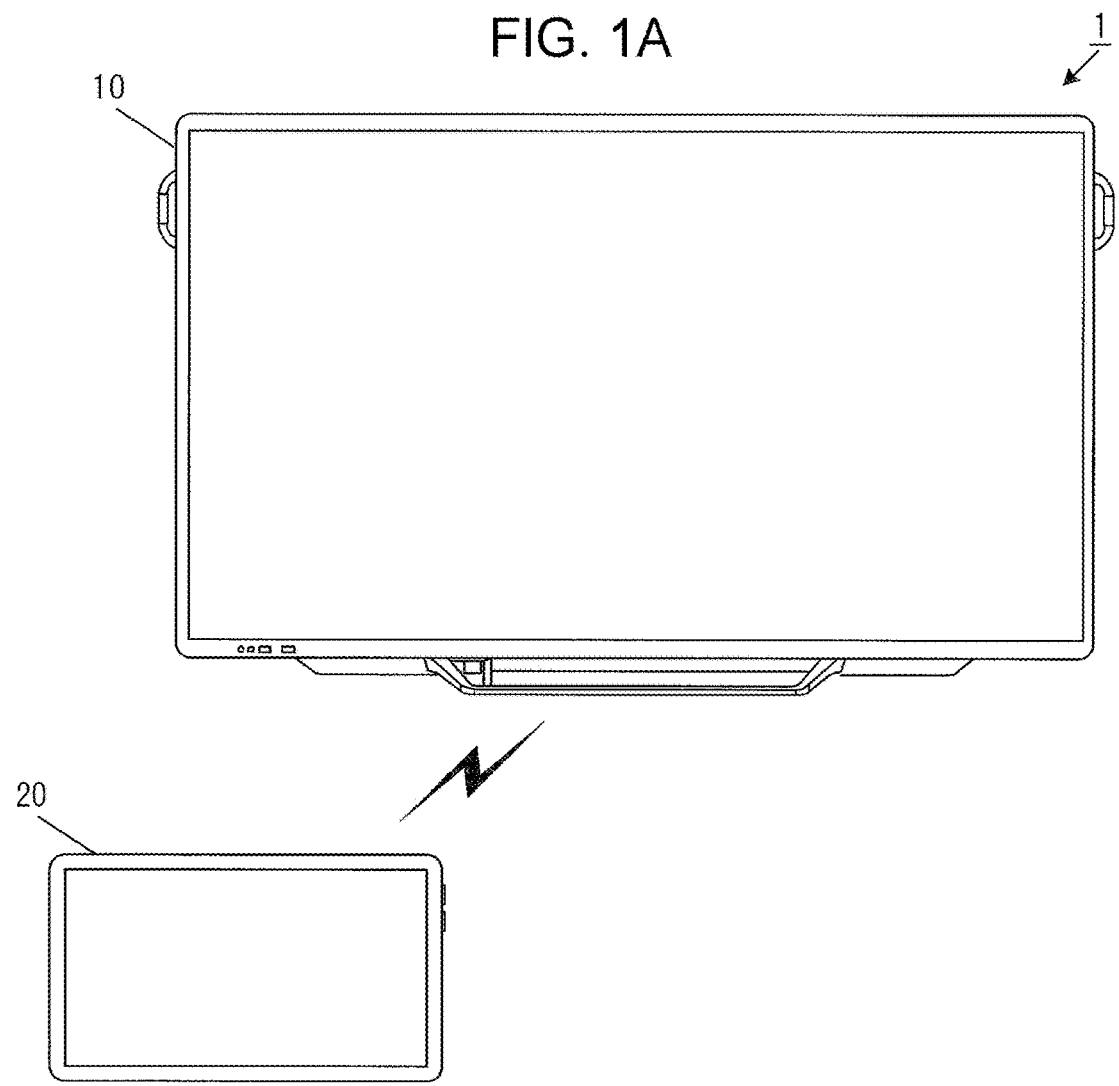
FIGS. 1A and 1B are diagrams for describing the appearance of the entire system according to a first embodiment.

Embodiments for embodying the present disclosure will be described below by referring to the drawings. For the sake of convenience of explanation, the embodiments will be described by taking, as an example, the case in which the display apparatus provided by the present disclosure is applied to a display apparatus integral with a touch panel. However, as a matter of course, as long as a display apparatus on which objects may be drawn or disposed through a user's operation input is employed, any apparatus may be applied.

First Embodiment

Overall Configuration

Figure 1B:
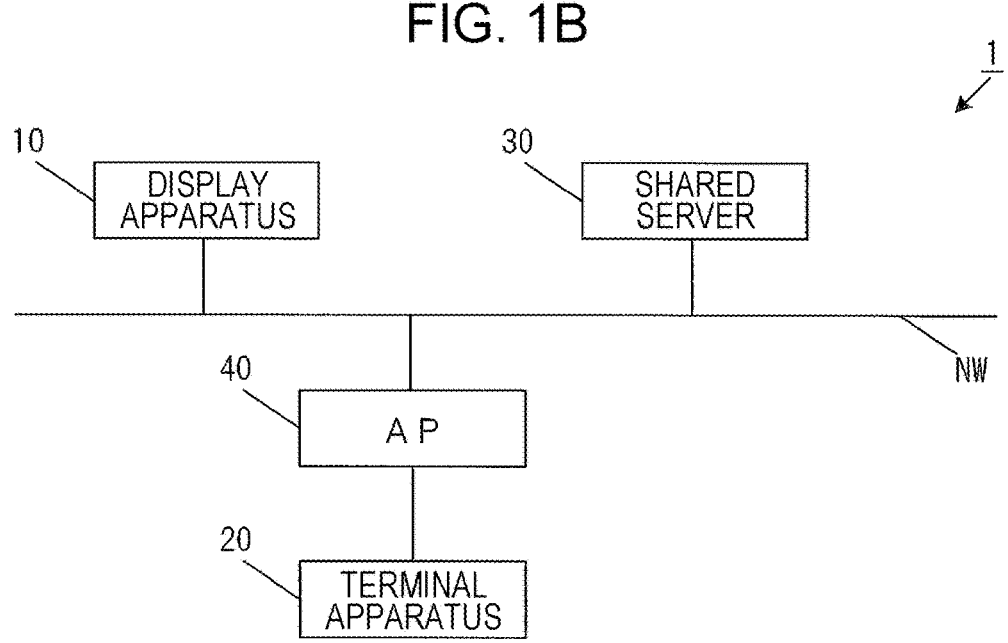

FIGS. 1A and 1B illustrate a content delivery system 1 to which the content delivery system provided by the present disclosure is applied. FIG. 1A is a diagram illustrating the overview of the appearance. The content delivery system 1 includes at least a display apparatus 10 and a terminal apparatus 20.

The display apparatus 10 according to the first embodiment is assumed to be a large display apparatus. Examples of the display apparatus 10 include an electronic whiteboard (interactive whiteboard (IWB)), a large television set, and a table-type display device. In the first embodiment, it is assumed that a display apparatus, for example, using a liquid crystal display (LCD) is used. However, for example, an irradiation-type apparatus such as a projector may be used.

The terminal apparatus 20 according to the first embodiment is assumed to be a small display apparatus. For example, it is assumed that a tablet information terminal apparatus, a smartphone, or a computer, which is used, for example, by a meeting participant or a student, is used.

The first embodiment describes the display apparatus 10 and the terminal apparatus 20. That is, as long as a slave (the terminal apparatus 20 according to the first embodiment) is connected to a master (the display apparatus 10 according to the first embodiment), any relationship may be employed. A user sets a master-slave relationship. The relationship is set appropriately depending on the usage case.

FIG. 1B describes the configuration of the content delivery system 1. The display apparatus 10 is connected to a network NW. The terminal apparatus 20 is also connected to the network NW, and is capable of communicating with the display apparatus 10 over the network NW. In the first embodiment, the terminal apparatus 20 is connected to the network NW via an access point (AP) 40 connected to the network NW.

In the first embodiment, a shared server 30 is connected to the network NW, and is capable of communicating with the display apparatus 10 and the terminal apparatus 20. In the first embodiment, content is shared through a shared folder that is set in the shared server 30. Alternatively, a shared folder may be set in the display apparatus 10, or may be set in a cloud server when an external cloud server is used.

A description will be made under the assumption that the display apparatus 10 and the terminal apparatus 20 according to the first embodiment include touch panels which may receive touch input.

A touch panel may receive operation input, such as a touch, a flick, and a swipe, from a user. The type of touch panel of detecting a touch and the like may be a capacitive type or a pressure-sensitive type. That is, as long as the apparatus is capable of receiving a user's operation input such as a touch appropriately, any apparatus may be used.

A touch may be performed by using a user's finger or a pen. In the case of use of a pen, the user of the pen may be identified, for example, by using unique identification information (for example, the serial number or the MAC address) with which the pen may be identified.

In the first embodiment, a system which facilitates transfer or delivery of content between the terminal apparatus 20 and the display apparatus 10 is described. The content indicates various types of data that may be used in the display apparatus 10 and the terminal apparatus 20. The content includes data, such as a still-image file (still-image data, such as Joint Photographic Experts Group (JPEG), Graphic Interchange Format (GIF), or portable network graphics GIF (PNG)), a document file (for example, a text file, a document file using word processing/spread sheet/presentation software, or a Portable Document Format (PDF) file), a moving image file (for example, moving image data of the audio video interleaved (avi) format or the moving picture experts group (MPEG) format), and an audio file (for example, the audio data of the MPEG-1 Audio Layer 3 (mp3) format or the wav format).

Functional Configuration

The functional configuration of each apparatus according to the first embodiment will be described.

Display Apparatus

Figure 2:
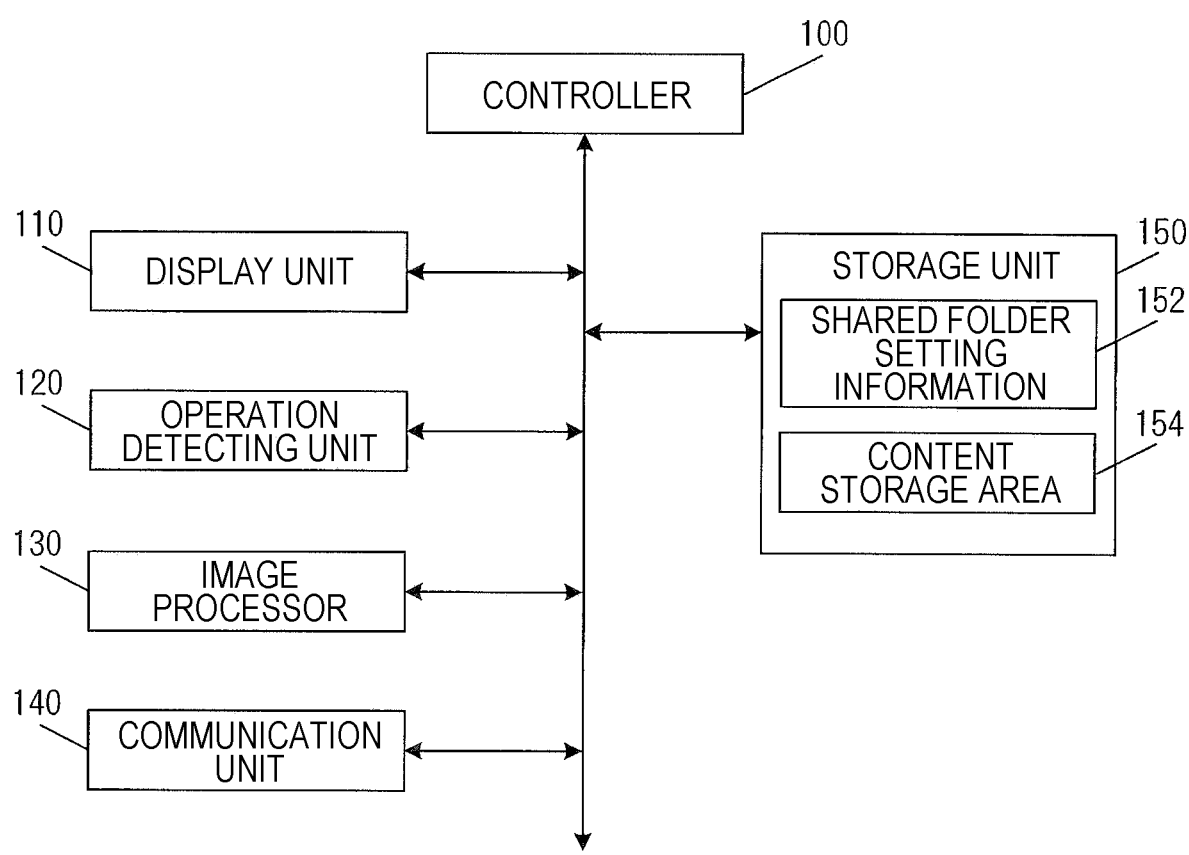
FIG. 2 is a diagram for describing the functional configuration of a display apparatus according to the first embodiment.

The functional configuration of the display apparatus 10 will be described by using FIG. 2. As illustrated in FIG. 2, the display apparatus 10 includes a controller 100, a display unit 110, an operation detecting unit 120, an image processor 130, a communication unit 140, and a storage unit 150.

The controller 100 is a functional unit for controlling the entire display apparatus 10. The controller 100 reads and executes various programs stored in the storage unit 150, so as to implement various functions. The controller 100 includes, for example, a central processing unit (CPU).

The controller 100 controls display of objects such as images which are drawn and input through a display screen (the operation detecting unit 120), for example, in the case where the display apparatus 10 includes a touch panel. The controller 100 also controls display of images received from other image input apparatuses.

The display unit 110 is a functional unit for displaying various types of information to a user and for displaying a sheet on which objects are drawn and disposed. The display unit 110 includes, for example, a liquid crystal display (LCD) or an organic electroluminescent (EL) display. Alternatively, the display unit 110 may be an irradiation-type/projection-type display control apparatus such as a projector.

The operation detecting unit 120 is a functional unit for detecting a user's operation. For example, the operation detecting unit 120 includes a touch panel integral with the display unit 110. The operation detecting unit 120 may employ any method for detecting an operation, for example, a capacitive type, a pressure-sensitive type such as a resistance film type, an infrared radiation type, or an electromagnetic induction type.

In the case where the display unit 110 is a display control apparatus of the irradiation type or the like, a person detecting sensor or the like may be used as the operation detecting unit 120 to detect an operation.

The image processor 130 is a functional unit for processing various types of images. That is, when content is to be displayed on the display unit 110, the image processor 130 performs various types of processing. For example, a still image is enlarged or reduced in size for display as content, or a moving image is played as content.

In addition, the image processor 130 creates, from content, a sheet which serves as a thumbnail image, and performs various types of image processing, such as a color adjustment process and a sharpening process, on content.

The communication unit 140 is a network interface for connection to the network NW. The communication method may be wired/wireless and a local area network (LAN)/wide area network (WAN). That is, in the first embodiment, as long as the communication unit 140 communicates with the terminal apparatus 20 and the shared server 30, any configuration may be employed. In the case of a wired LAN, an Ethernet® standard, such as 10BASE-T, 100BASE-TX, or 1000BASE-T, is used. In the case of a wireless LAN, a standard such as IEEE802.11a/b/g/n is used. In the case of a WAN, Long Term Evolution (LTE), worldwide interoperability for microwave access (WiMAX), 3rd generation (3G), or the like is used.

In the case where the shared server 30 is not used and where the communication unit 140 directly communicates with the terminal apparatus 20, near field communication, such as Bluetooth or ZigBee, may be used.

The storage unit 150 is a functional unit that stores various programs used in operations performed by the display apparatus 10 and that stores various data. The storage unit 150 includes, for example, a semiconductor memory such as a solid state drive (SSD) and a magnetic disk such as a hard disk drive (HDD).

The storage unit 150 stores shared folder setting information 152. In the storage unit 150, a content storage area 154 is allocated.

The shared folder setting information 152 stores settings of a shared folder which serves as an exemplary storage area for sharing content with other apparatuses such as the terminal apparatus 20. For example, in the case where "\\Server\share\user1" is stored, the specified folder (directory) is set as the shared folder.

The storage area for sharing content may be a shared folder in a server or an apparatus, or may be, for example, information about an external file service (for example, account information of a cloud service). The storage area is not limited to a folder. As long as it is a storage area, such as a drive, an apparatus, or a storage medium, through which files and the like may be shared, any configuration may be employed.

The content storage area 154 stores content. Content created or edited on the display apparatus 10 and content received from other apparatuses are stored.

Terminal Apparatus

Figure 3:
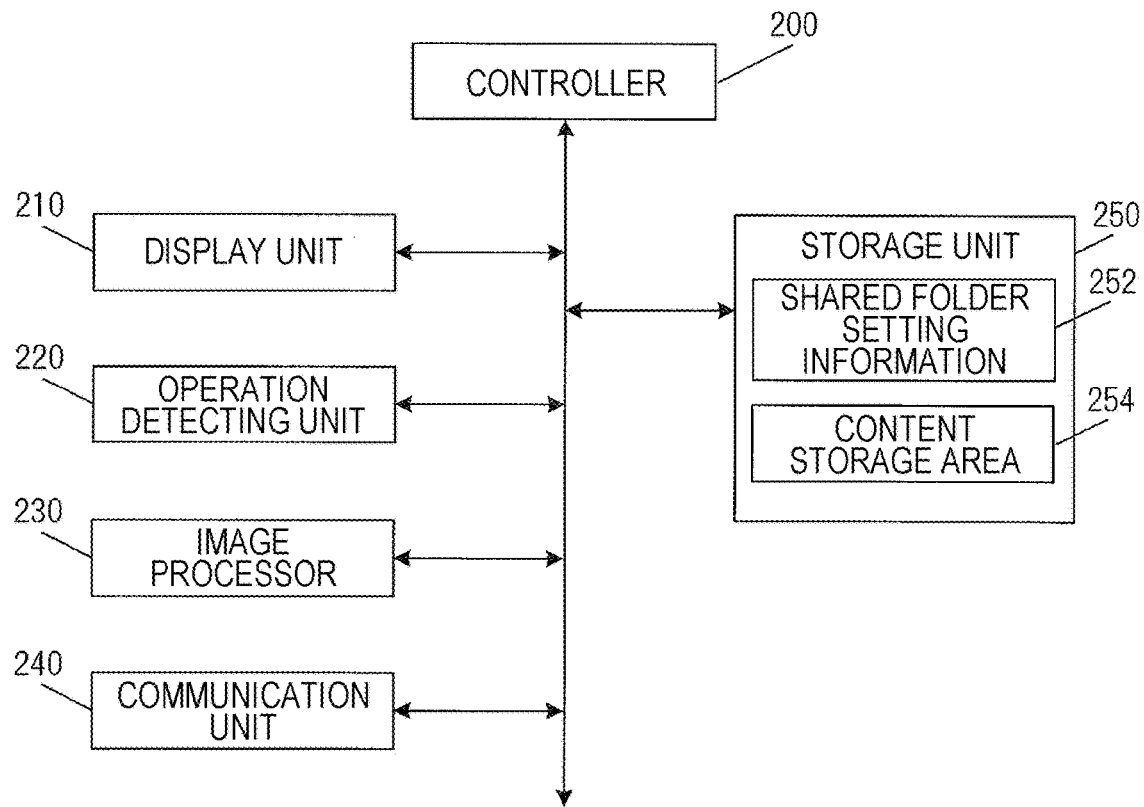
FIG. 3 is a diagram for describing the functional configuration of a terminal apparatus according to the first embodiment.

The functional configuration of the terminal apparatus 20 will be described by using FIG. 3. As illustrated in FIG. 3, the terminal apparatus 20 includes a controller 200, a display unit 210, an operation detecting unit 220, an image processor 230, a communication unit 240, and a storage unit 250.

The controller 200 is a functional unit for controlling the entire terminal apparatus 20. The controller 200 reads and executes various programs stored in the storage unit 250, so as to implement various functions. The controller 200 includes, for example, a CPU.

The controller 200 controls display of objects such as images which are drawn and input through a display screen (the operation detecting unit 220), for example, in the case where the terminal apparatus 20 includes a touch panel. The controller 200 also controls display of images received from other image input apparatuses.

The display unit 210 is a functional unit for displaying various types of information to a user and for displaying a sheet on which objects are drawn and disposed. The display unit 210 includes, for example, an LCD or an organic EL display. Alternatively, the display unit 210 may be an irradiation-type/projection-type display control apparatus such as a projector.

The operation detecting unit 220 is a functional unit for detecting a user's operation. For example, the operation detecting unit 220 includes a touch panel integral with the display unit 210. The operation detecting unit 220 may employ any method for detecting an operation, for example, a capacitive type, a pressure-sensitive type such as a resistance film type, an infrared radiation type, or an electromagnetic induction type.

When the display unit 210 is a display control apparatus of the irradiation type or the like, a person detecting sensor or the like may be used as the operation detecting unit 220 to detect an operation.

The image processor 230 is a functional unit for processing various types of images. That is, when content is to be displayed on the display unit 210, the image processor 230 performs various types of processing. For example, a still image is enlarged or reduced in size for display as content, or a moving image is played as content.

In addition, the image processor 230 creates, from content, a sheet which serves as a thumbnail image, and performs various types of image processing, such as a color adjustment process and a sharpening process, on content.

The communication unit 240 is a network interface for connection to the network NW. The communication method may be wired/wireless and a LAN/WAN. That is, in the first embodiment, as long as the communication unit 240 communicates with the display apparatus 10 and the shared server 30, any configuration may be employed. In the case of a wired LAN, an Ethernet® standard, such as 10BASE-T, 100BASE-TX, or 1000BASE-T, is used. In the case of a wireless LAN, a standard such as IEEE802.11a/b/g/n is used. In the case of a WAN, LTE, WiMAX, 3G, or the like is used.

In the case where the shared server 30 is not used and where the communication unit 240 directly communicates with the display apparatus 10, near field communication, such as Bluetooth or ZigBee, may be used.

The storage unit 250 is a functional unit that stores various programs used in operations performed by the terminal apparatus 20 and that stores various types of data. The storage unit 250 includes, for example, a semiconductor memory such as an SSD and a magnetic disk such as an HDD.

The storage unit 250 stores shared folder setting information 252. In the storage unit 250, a content storage area 254 is allocated.

The shared folder setting information 252 stores settings of a shared folder for sharing content with other apparatuses such as the display apparatus 10. For example, in the case where "\\Server\share\user1" is stored, the specified folder (directory) is set as the shared folder.

The content storage area 254 stores content. Content created or edited by the terminal apparatus 20 and content received from other apparatuses are stored. The content according to the first embodiment indicates various types of data represented in various data formats, such as text data, document data, an audio file, an image file (still-image data), and a moving image file (moving image data).

Shared Server

Figure 4:
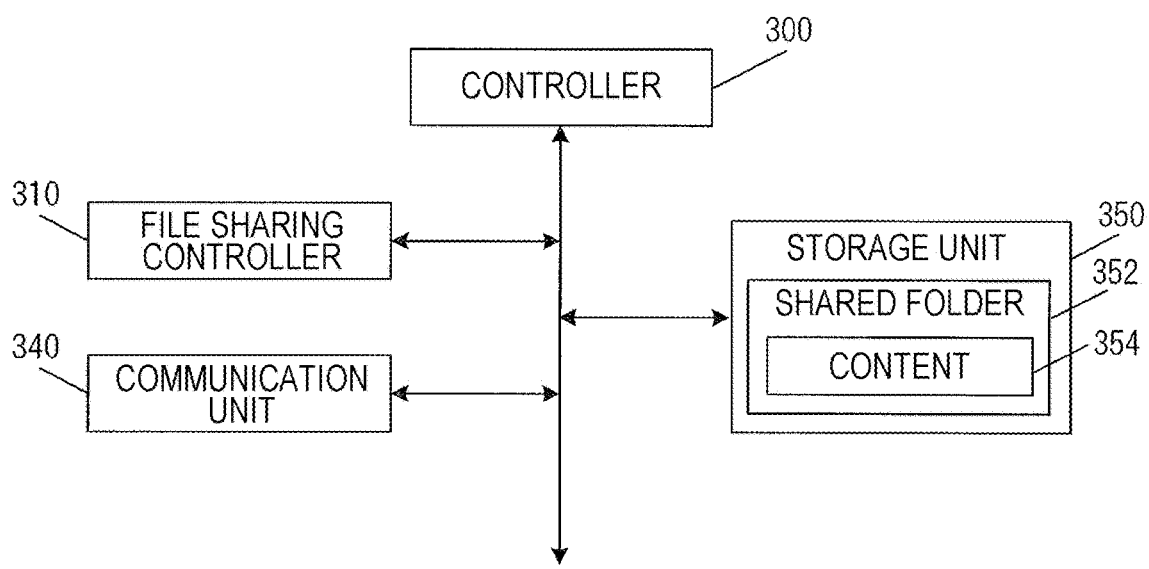
FIG. 4 is a diagram for describing the functional configuration of a shared server according to the first embodiment.

The functional configuration of the shared server 30 will be described by using FIG. 4. As illustrated in FIG. 4, the shared server 30 includes a controller 300, a file sharing controller 310, a communication unit 340, and a storage unit 350. The shared server 30 may include an operation unit and a display unit when appropriate.

The controller 300 is a functional unit for controlling the entire shared server 30. The controller 300 reads and executes various programs stored in the storage unit 350, so as to implement various functions. The controller 300 includes, for example, a CPU.

The file sharing controller 310 is a functional unit for providing a file sharing service. For example, the file sharing controller 310 is a functional unit that sets a shared folder and that sets access permission to the shared folder. The file sharing service is implemented, for example, by using server message block (SMB), NetBIOS extended user interface (NetBEUI), web-based distributed authoring and versioning (WebDAV), or the like, or file transfer protocol (FTP) or the like.

The communication unit 340 is a network interface for connection to the network NW. The communication method may be wired/wireless and a LAN/WAN. That is, in the first embodiment, as long as the communication unit 340 communicates with the display apparatus 10 and the terminal apparatus 20, any configuration may be employed. In the case of a wired LAN, an Ethernet® standard, such as 10BASE-T, 100BASE-TX, or 1000BASE-T, is used. In the case of a wireless LAN, a standard such as IEEE802.11a/b/g/n is used. In the case of a WAN, LTE, WiMAX, 3G, or the like is used.

The storage unit 350 is a functional unit that stores various programs used in operations performed by the shared server 30 and that stores various types of data. The storage unit 350 includes, for example, a semiconductor memory such as an SSD and a magnetic disk such as an HDD.

In the storage unit 350, a shared folder 352 is set. In the shared folder 352, content 354 is stored.

One or more shared folders 352 may be set. A corresponding shared folder 352 may be set for each display apparatus 10. In addition, the shared folder 352 may be associated with a tunnel tray described below.

Process Flow

The process flow according to the first embodiment will be described by using figures. Before execution of the processes, a common shared folder is set in the display apparatus 10 and the terminal apparatus 20.

That is, one of the folders in the shared server 30 is set as a shared folder. The shared folder is set as being shared, so as to be capable of receiving, for example, read/write operations from the display apparatus 10 and the terminal apparatus 20. The shared folder that has been set is stored as the shared folder setting information 152 and the shared folder setting information 252.

Processes Performed by the Terminal Apparatus

Figure 5:
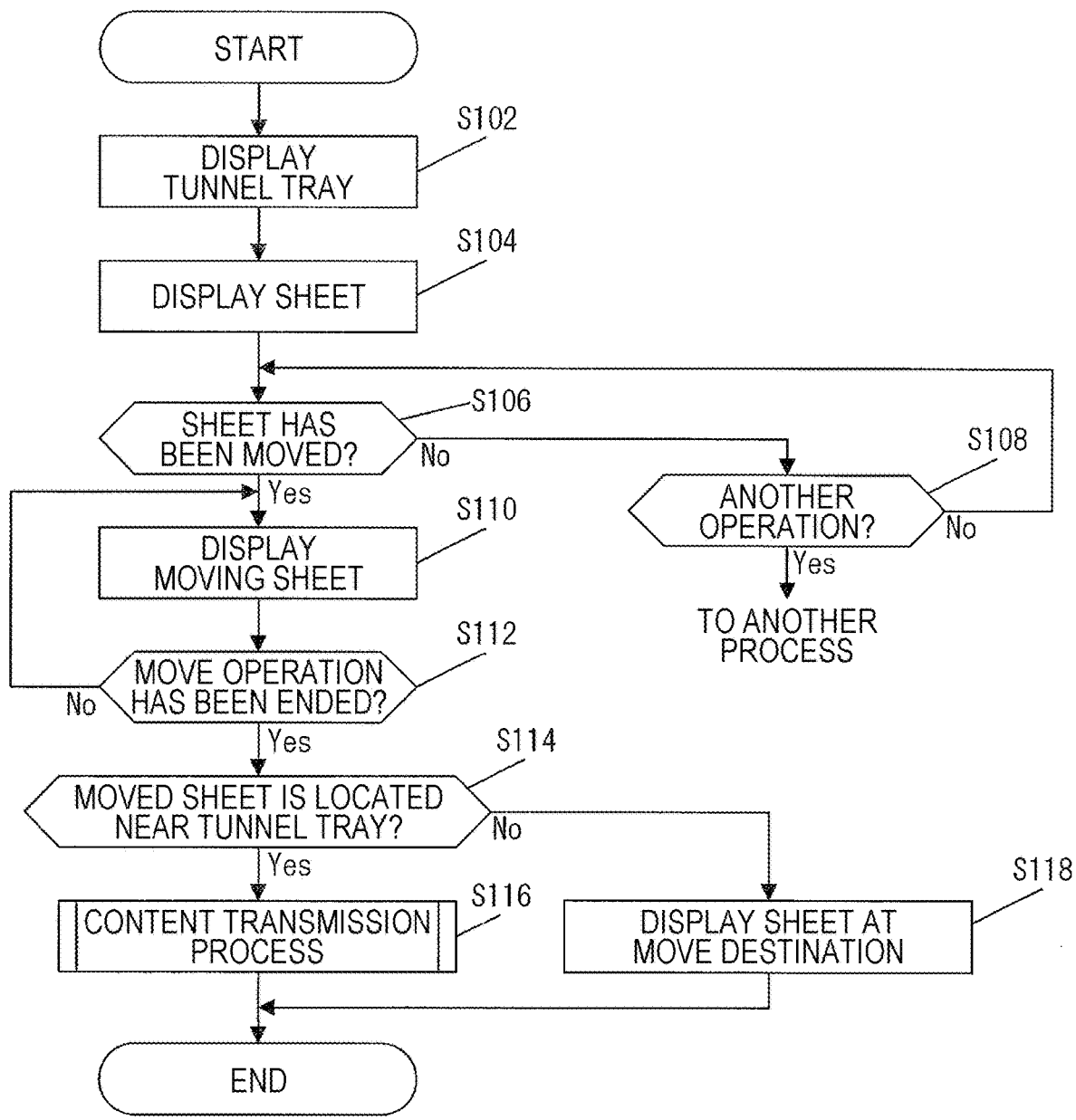
FIG. 5 is a flowchart for describing operations performed by a terminal apparatus according to the first embodiment.

Processes performed by the terminal apparatus 20 will be described based on FIG. 5. The terminal apparatus 20 displays a tunnel tray in a given display area on the display screen of the terminal apparatus 20 (step S102). The tunnel tray is a type of discriminative display for file delivery, and is displayed as a transmission icon. In the first embodiment, a circle is displayed at a position on the display screen to deliver files. The circle may be displayed on the front (the foreground) on the display screen at all times, and may be displayed in a given color (for example, red or blue). The representation of a tunnel tray is exemplary. As long as the discriminative display indicates an area for file delivery, another figure, characters, or the like may be used. Alternatively, a given area (coordinates) of the display screen may be set as the tunnel tray.

That is, a tunnel tray indicates a display for indicating a specific area of the display screen. The tunnel tray may be disposed at any position on the display screen. A user may set the size, the color, and the like as the user likes. In addition, when appropriate, instead of displaying a tunnel tray, a specific area of the display screen may have functions equivalent to the functions of the tunnel tray.

The terminal apparatus 20 displays a sheet (step S104). A sheet is an image indicating content, and one or more sheets may be displayed on the display screen of the terminal apparatus 20. A sheet indicates content that may be stored or read by the terminal apparatus 20. A sheet may indicate content created by the terminal apparatus 20, or may indicate content received from another apparatus.

Then, the terminal apparatus 20 determines whether or not a sheet has been moved (step S106). For example, when the terminal apparatus 20 detects a touch operation and a subsequent dragging operation on a sheet, the terminal apparatus 20 determines that a move operation has been detected. If another operation has been performed, the process (for example, copying, deleting, or printing) corresponding to the operation is performed. In the first embodiment, this case is not described (the Yes branch of step S108 from the No branch of step S106).

While a move operation is being performed on a sheet, the moving sheet is displayed (step S110). Any way of displaying a moving sheet may be employed as long as it indicates that the sheet is moving. For example, the moving image itself of the displayed sheet may be displayed. Alternatively, a moving discriminative display (for example, a rectangular display) indicating that the sheet is moving may be displayed.

If the terminal apparatus 20 detects end of the move operation (Yes in step S112), the terminal apparatus 20 determines the coordinates at which the move operation has been ended, and the terminal apparatus 20 determines whether or not the moved sheet is located near the tunnel tray (step S114).

Various methods may be used for determination about whether or not the moved sheet is located near the tunnel tray. For example, the terminal apparatus 20 may determine whether or not the center coordinates of the sheet are included in the area of the tunnel tray or its neighboring area (for example, ±5 pixels from a rectangular area including the tunnel tray). Alternatively, any coordinates in the area of the sheet (for example, the rectangular area) may be compared with coordinates of the tunnel tray.

Thus, various methods may be set as a design matter for determination about whether or not the moved sheet is located near the tunnel tray. Therefore, for example, like collision detection, any method may be used as long as it occurs to a person skilled in the art.

If the moved sheet is located near the tunnel tray, a content transmission process is performed (step S116 from the Yes branch of step S114). If the moved sheet is not located near the tunnel tray, the terminal apparatus 20 determines that the operation is a normal move operation. The terminal apparatus 20 displays the sheet at the position at which the move operation has been ended, and the process ends (step S118 from the No branch of step S114).

A move operation may be a flick operation. That is, when the terminal apparatus 20 detects a flick operation as the move operation performed in step S106, the terminal apparatus 20 determines a set of coordinates, along which the touch moves, and the move speed. If the move direction is the direction to the tunnel tray, and if the move speed is equal to or more than a given threshold, the terminal apparatus 20 performs the content transmission process. That is, a sheet may be moved to the tunnel tray by using a dragging operation or a flick operation.

The Content Transmission Process

The content transmission process performed by the terminal apparatus 20 will be described by referring to FIG. 6. The terminal apparatus 20 transmits, to the shared folder, the content corresponding to the sheet having been moved to a position near the tunnel tray (step S122).

After transmission of the content to the shared folder, the terminal apparatus 20 deletes the display of the moved sheet near the tunnel tray (step S124), and displays the sheet at the original position at which the sheet was located before the move (step S126).

In the process described above, after transmission of the content, the terminal apparatus 20 deletes the display of the moved sheet near the tunnel tray. As a matter of course, the processes in the reverse order may be performed. That is, after deletion of the display of the moved sheet near the tunnel tray (step S124), the terminal apparatus 20 may transmit the content to the shared folder (step S122).

A user may select whether or not the sheet is to be displayed at the original position at which the sheet was located before the move. Alternatively, the selection may be changed through settings. For example, when a sheet has been moved with a single touch operation, the sheet may be displayed at the original position at which the sheet was located before the move (that is, a copy operation). When a sheet has been moved with a multi-touch operation, the sheet is not necessarily displayed at the original position at which the sheet was located before the move (that is, a move operation).

In this case, the sheet may be accommodated in the drawer (for example, D130 in FIGS. 10A to 10C) associated with the sheet. Alternatively, the sheet may be reduced in size and displayed in a portion (for example, a predetermined thumbnail area) of the area of the display screen.

Processes Performed by the Display Apparatus

Processes performed by the display apparatus 10 will be described by referring to FIG. 7. In the display apparatus 10, the shared folder is set (step S152). If a user has set the shared folder in advance, or if an administrator has set the shared folder, the process is not necessarily performed.

The display apparatus 10 regularly checks if content has been stored in the shared folder (step S154). The display apparatus 10 checks the shared folder every given time (for example, every 3 seconds, every 10 seconds, or every 30 seconds). The display apparatus 10 repeatedly checks the shared folder until content has been stored in the shared folder (step S154 from the No branch of step S156).

If content has been stored (is present) in the shared folder (Yes in step S156), the display apparatus 10 determines whether or not the content is supported (step S158).

Supported content is, for example, content that is capable of being displayed, played, and opened for use by the display apparatus 10. For example, if an application for displaying or editing the content is not present, or if a corresponding codec has not been installed, the display apparatus 10 determines that the content is not supported, and ignores the content (step S154 from the No branch of step S158).

Some examples will be described. For example, in the case where content stored in the shared folder is a "dxf file", if an application for using a dxf file has not been installed in the display apparatus 10, the display apparatus 10 determines that the content is not supported. In the case where content is an "avi file", assume the following case. An application for using an avi file has been installed. However, a codec for the file has not been installed, and the file fails to be played. In this case, the display apparatus 10 determines that the content is not supported.

Not-supported content is ignored as described above. In addition, such content may be deleted from the shared folder.

If the content stored in the shared folder is supported (Yes in step S158), a sheet (image) is created when the sheet (image) has to be created (step S162 from the Yes branch of step S160). For example, in the case where the content is still-image content, and where the still-image content (still-image data), as it is, is reduced in size and displayed as a sheet, a sheet image is not necessarily created. Therefore, the still-image content may be used as it is as a sheet (No in step S160). When the content already includes a preview image, the preview image may be used as it is as a sheet (image).

Even in the case of still-image content, if the content includes multiple pieces of still-image data, one of the still images may be specified as a sheet (image), and a sheet may be created from the specified still image.

Then, the display apparatus 10 copies the content from the shared folder of the shared server 30 to a folder of the display apparatus 10 (step S164). The display apparatus 10 deletes the content from the shared folder (step S166), and displays the sheet corresponding to the content on the display screen of the display apparatus 10 (step S168).

As a matter of course, the order of the steps described above may be changed in the range in which no contradiction occurs in the process. For example, step S164 may be performed after step S158. That is, the content is first copied to the display apparatus 10, and a sheet is then created based on the copied content.

Exemplary Operations

Figure 8A:
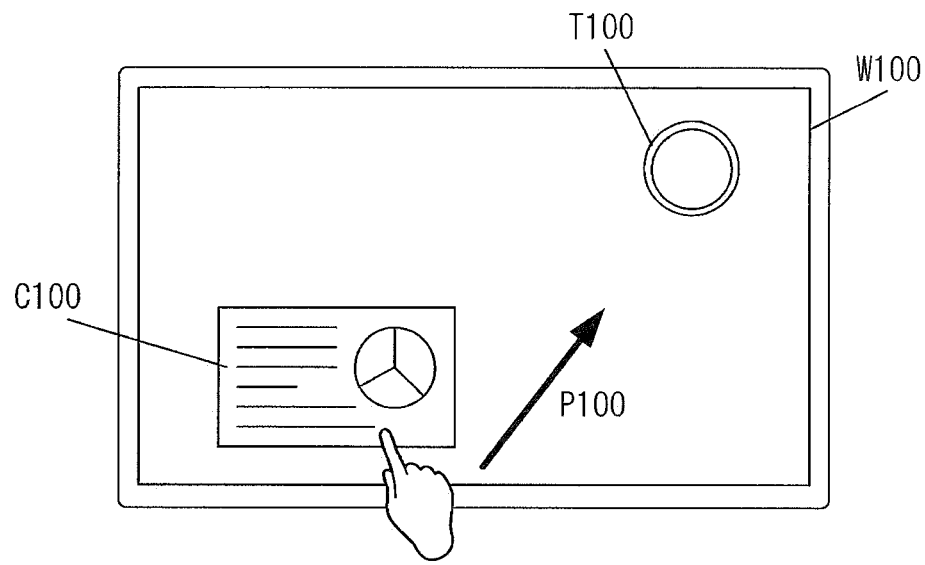
FIGS. 8A and 8B are diagrams for describing an exemplary operation according to the first embodiment.
Figure 8B:
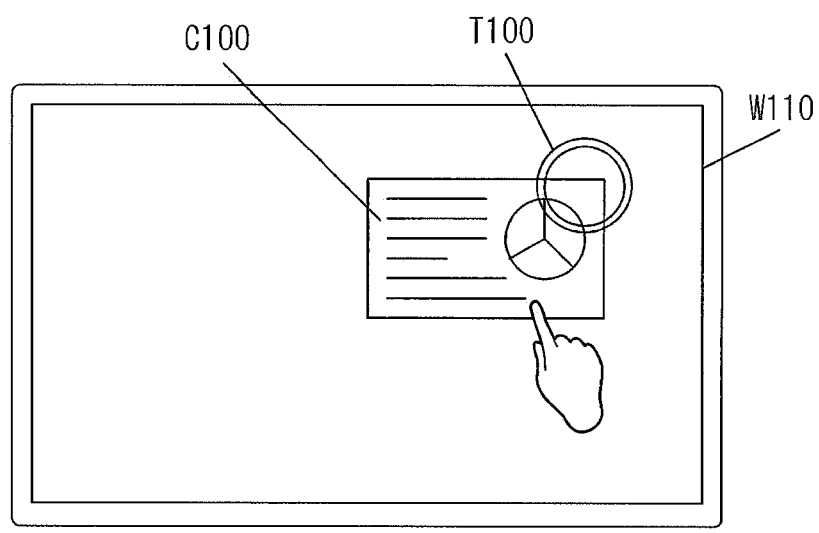
Figure 9A:
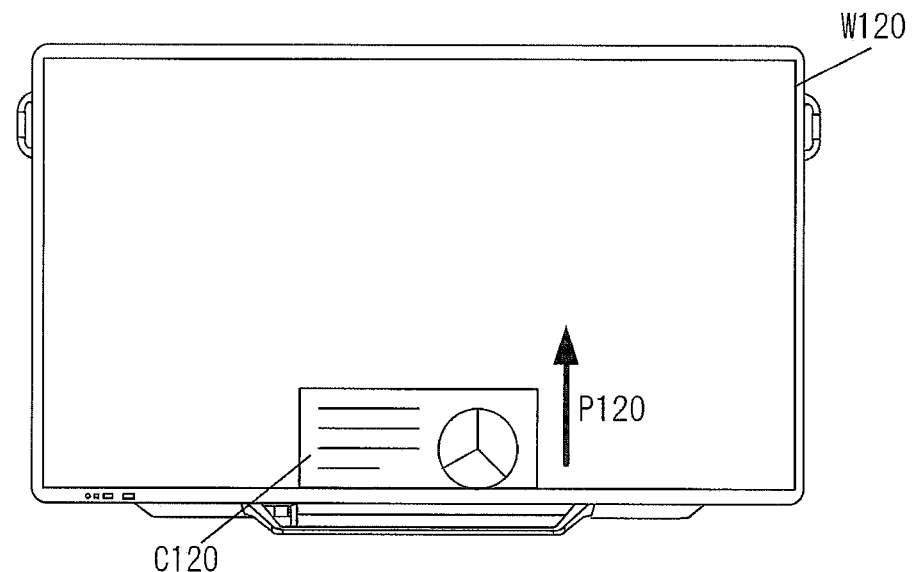
FIGS. 9A and 9B are diagrams for describing an exemplary operation according to the first embodiment.
Figure 9B:
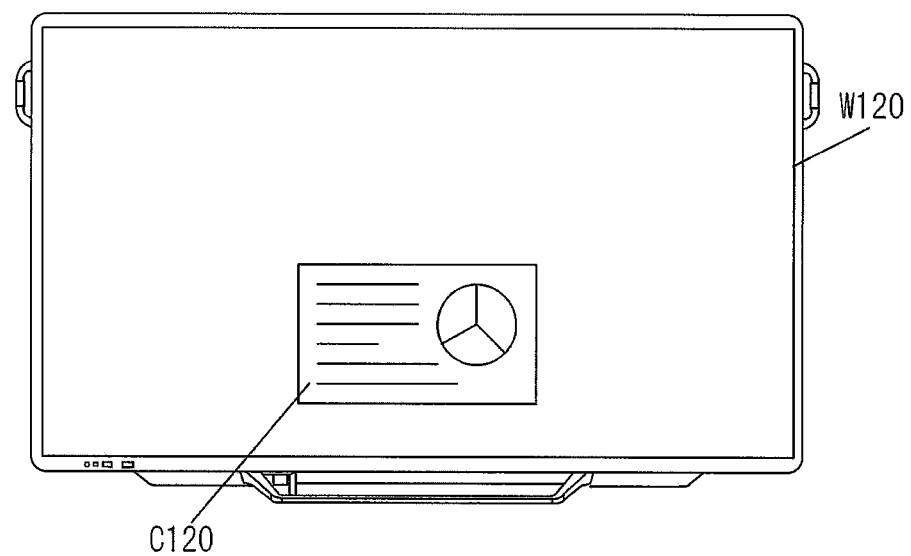

Exemplary operations according to the first embodiment will be described. FIGS. 8A and 8B illustrate exemplary display screens of the terminal apparatus 20. FIGS. 9A and 9B illustrate exemplary display screens of the display apparatus 10.

In the first embodiment, the display apparatus 10 and the terminal apparatus 20 are capable of displaying content. The display apparatus 10 is taken as an example. A sheet corresponding to content is displayed in an area called a work area provided on the display screen.

A sheet is image data created based on content, and is a preview image indicating the content. For example, when the content is a document file, a preview image created from a representative page may be displayed. When the content is a moving image file, a capture image of a certain scene may be displayed as a still image, or the content may be displayed as a moving image by playing the content on the sheet.

A user drags content from an external application or a drawer and drops the content in the work area provided on the display screen, or selects and opens the content. Thus, the content may be displayed as a sheet. When the content is a still-image file, the still image is displayed. When the content is a moving image file, the moving image file is displayed. When the content is a document file having multiple pages, a sheet on which the pages may be turned is displayed.

Thus, a user's selection of a sheet may cause the corresponding content to be displayed. A sheet may be moved, enlarged, reduced in size, and rotated. In addition, operations, such as a page split and page coupling, may be performed on a sheet.

FIG. 8A illustrates an exemplary display screen W100 displayed on the terminal apparatus 20. On the display screen W100, a tunnel tray T100 is displayed. In the work area of the display screen, a sheet C100 indicating content is displayed. The sheet that is moved, enlarged, reduced in size, and rotated may be displayed.

A user selects the sheet C100 with a touch operation, and moves the sheet C100 in the direction P100. Then, the moving sheet C100 is displayed, and the display is changed to the state in FIG. 8B.

On a display screen W110 in FIG. 8B, the moving sheet C100 is displayed near the tunnel tray T100. At that time, the tunnel tray T100 is displayed above the sheet C100.

In this state, when the user releases the selection (performs a touch up operation), the content corresponding to the sheet C100 is transmitted (copied) to the shared folder. The shared folder is set in the shared folder setting information 252. In the first embodiment, the shared folder is the shared folder 352 of the shared server 30.

FIGS. 9A and 9B are diagrams for describing an exemplary operation performed by the display apparatus 10. The display apparatus 10 regularly checks the shared folder, and detects newly stored content.

When the display apparatus 10 confirms presence of new content, the display apparatus 10 creates a sheet corresponding to the content (an image corresponding to a preview image of the content). The display apparatus 10 displays the created sheet on a display screen W120.

For example, in the first embodiment, a sheet C120 is displayed on the display screen W120 from below. The sheet C120 sliding in the direction P120 is displayed. As illustrated in FIG. 9B, the sheet C120 is displayed on the display screen W120. Thus, in the first embodiment, the display apparatus 10 is capable of automatically receiving content transmitted from the terminal apparatus 20.

A sheet image corresponding to the received content is automatically created. The created image is automatically displayed in the work area of the display screen of the display apparatus 10.

At that time, the sheet may be discriminatively displayed. For example, the display form of the sheet may be changed and displayed so as to indicate that it is newly obtained content. For example, the frame color may be changed for a certain time, or the sheet may be displayed with emphasis. In addition, the transparency may be changed, or the sheet may blink. Thus, a sheet may be discriminatively displayed for a time. In this manner, a user may be notified of which sheet is new.

A display apparatus of the related art will be described by referring to FIGS. 10A to 10C. For example, drawers associated with folders of the display apparatus of the related art are displayed on the display apparatus. When a user selects a drawer, a list of pieces of content contained in the folder corresponding to the drawer is displayed.

Figure 10A:
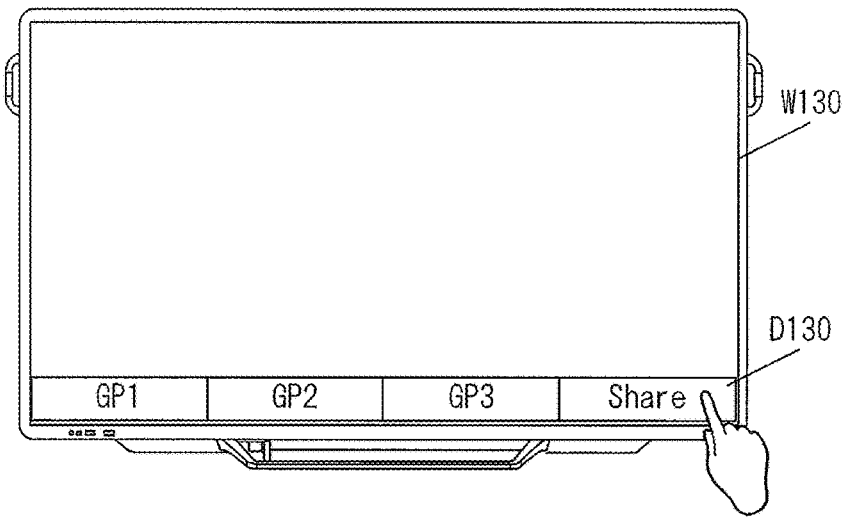
FIGS. 10A to 10C are diagrams for describing an exemplary operation of the related art.

Specifically, as illustrated in FIG. 10A, a list of drawers is displayed in a lower end portion of a display screen W130. At that time, when the user selects the drawer D130, a screen transition is made. FIG. 10B illustrates the screen displayed after the transition.

Figure 10B:
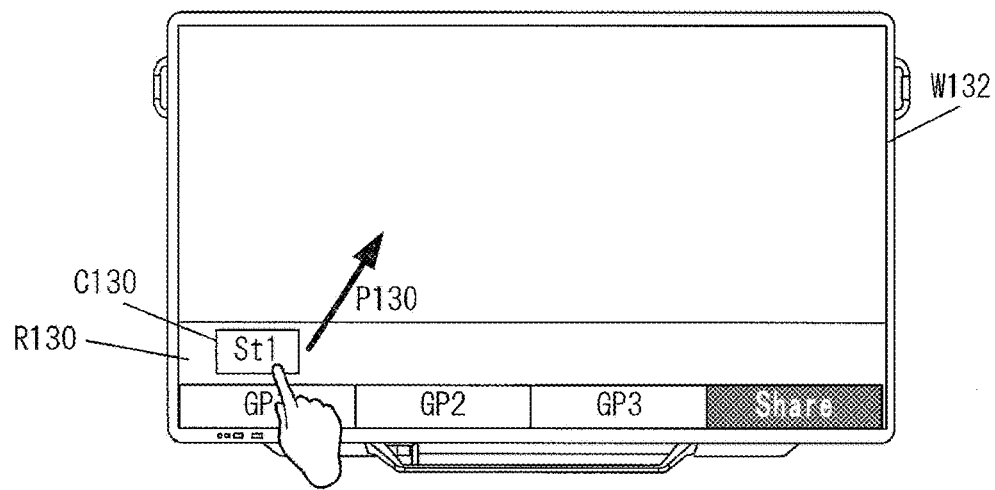
Figure 10C:
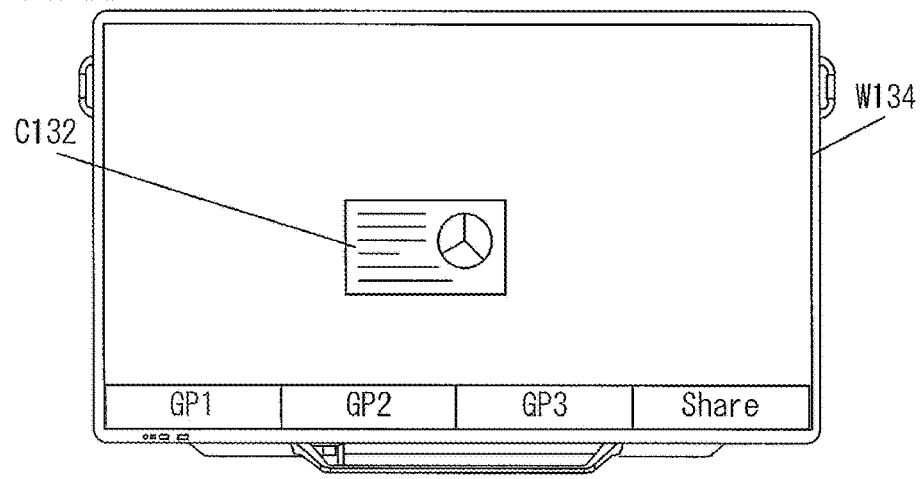

In FIG. 10B, a list of the reduced images of the sheets corresponding to the pieces of content contained in the drawer D130 is displayed in an area R130. At that time, a list of pieces of content is displayed. In this state, when the user selects content C130 and moves the content C130 in the direction P130 (that is, moves the content C130 to the work area), a sheet corresponding to the content is created and displayed in the work area.

Thus, in the related art, the display apparatus 10 does not have a way to recognize reception of content. Even when content is received, the content has to be selected and then displayed. In addition, in creation of sheets based on content, only the sheet corresponding to the selected content is displayed. No functions for automatically creating and displaying a sheet are provided.

The first embodiment enables easy reception/transmission (delivery) of content between the display apparatus 10 and the terminal apparatus 20. In the display apparatus 10, since a sheet corresponding to content is created and displayed without a user's effort, the user may easily grasp what kind of content has been received.

Second Embodiment

A second embodiment will be described. In the second embodiment, a sheet is deleted with high visibility for a user in step S124 in FIG. 6 according to the first embodiment. The functional configuration of the apparatuses according to the second embodiment is the same as that according to the first embodiment. The process flows according to the second embodiment are also the same as those according to the first embodiment.

Figure 6:
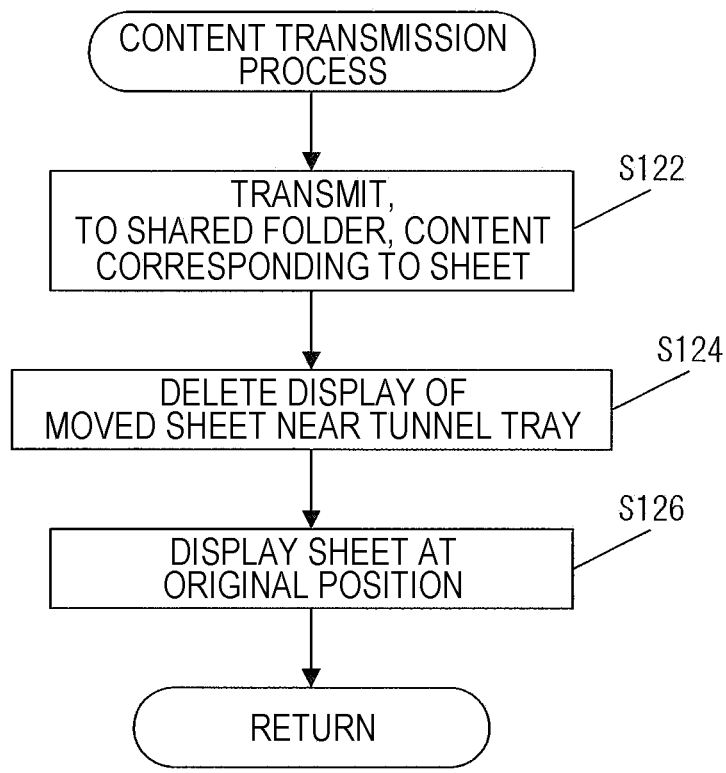
FIG. 6 is a flowchart for describing a transmission process performed by a terminal apparatus according to the first embodiment.

The second embodiment describes various display forms in deletion of a sheet in step S124 in FIG. 6.

Figure 11A:
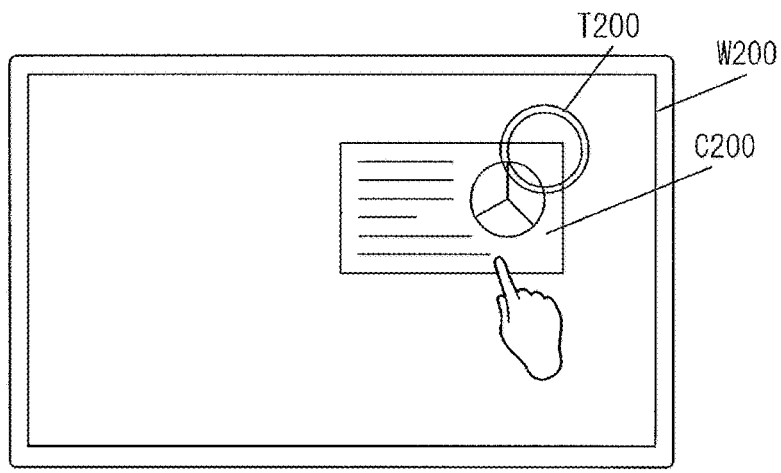
FIGS. 11A to 11D are diagrams for describing an exemplary operation according to a second embodiment.
Figure 11B:
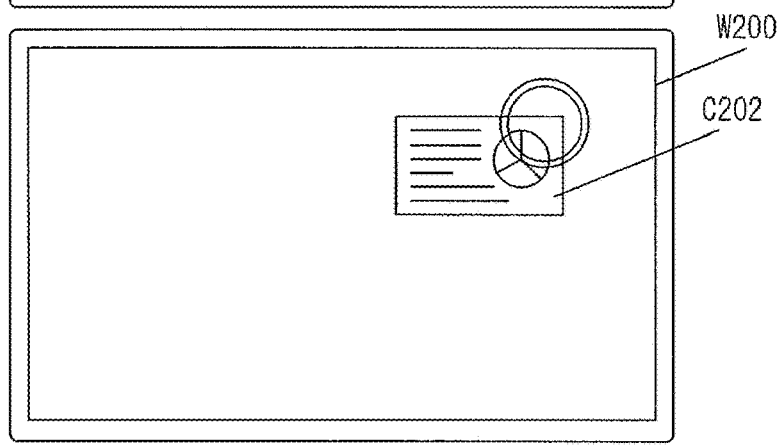
Figure 11C:
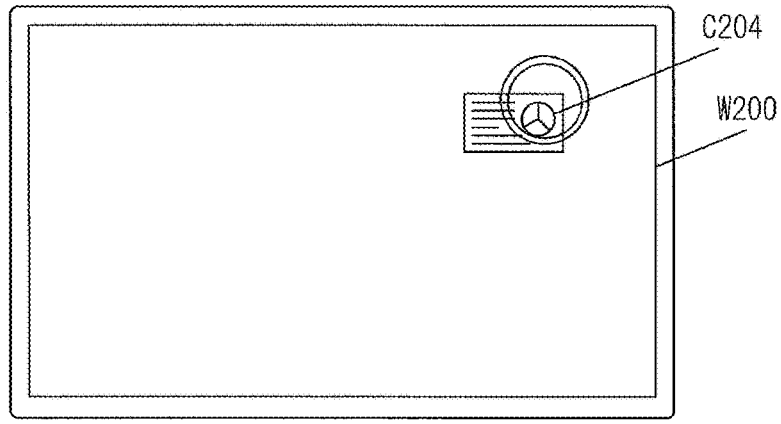
Figure 11D:
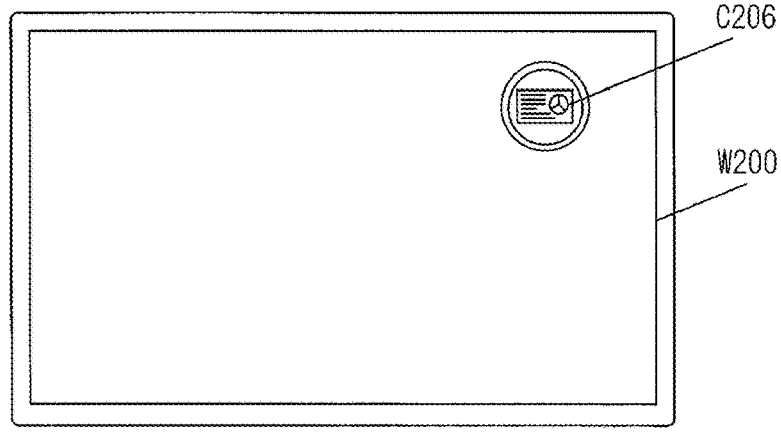

FIGS. 11A to 11D illustrate an exemplary display screen W200 displayed when a sheet is deleted in the second embodiment. For example, as illustrated in FIG. 11A, a sheet C200 is displayed on a tunnel tray T200. At that time, when the selection is released (a touch up operation is performed), the content corresponding to the sheet is transmitted to the shared folder.

At that time, the sheet C200 is displayed so as to be gradually reduced in size while moving to the center of the tunnel tray T200. FIGS. 11A to 11D illustrate a sheet C202 in FIG. 11B, a sheet C204 in FIG. 11C, and a sheet C206 in FIG. 11D, from which it is found that the sheet C200 is gradually reduced in size.

That is, the sheet C200 overlapping the tunnel tray causes gradual reduction in size of the sheet. While the center of the sheet approaches the center of the tunnel tray, the sheet is being reduced in size. At last, the sheet is reduced in size so as to be accommodated in the tunnel tray. The sheet may be deleted in the state in which the sheet is accommodated in the tunnel tray, or the sheet may be continuously reduced in size.

Thus, a user views the state as if the imaged sheet is taken into the tunnel tray. This enables the user to have a clear image indicating that content is being transmitted.

Figure 12A:
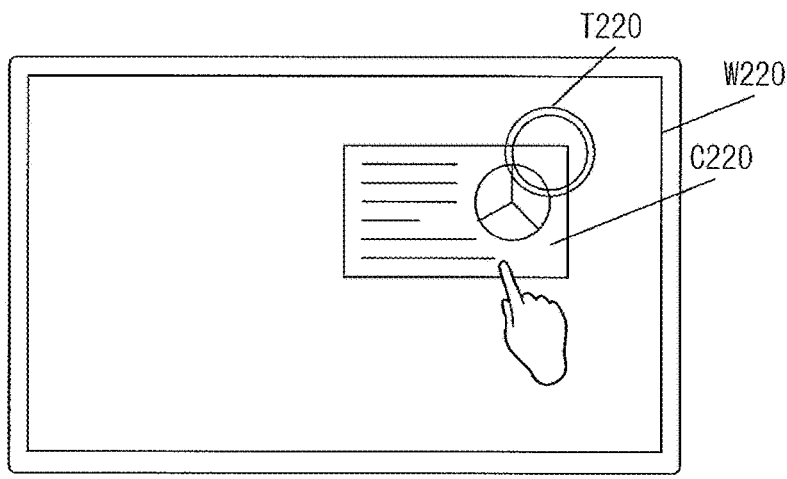
FIGS. 12A to 12D are diagrams for describing an exemplary operation according to the second embodiment.
Figure 12B:
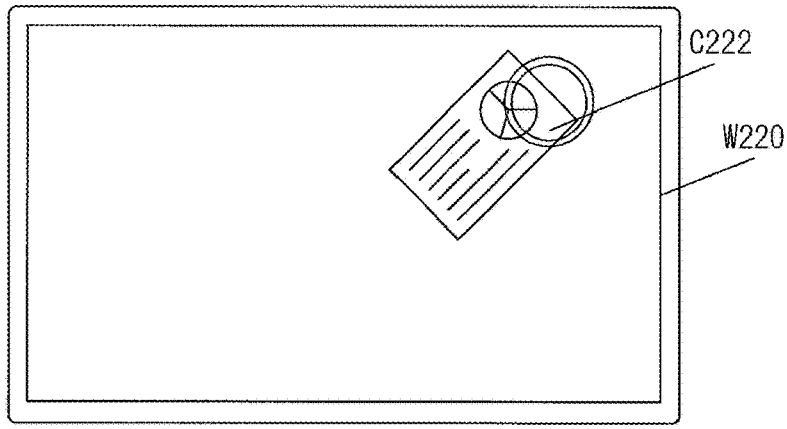
Figure 12C:
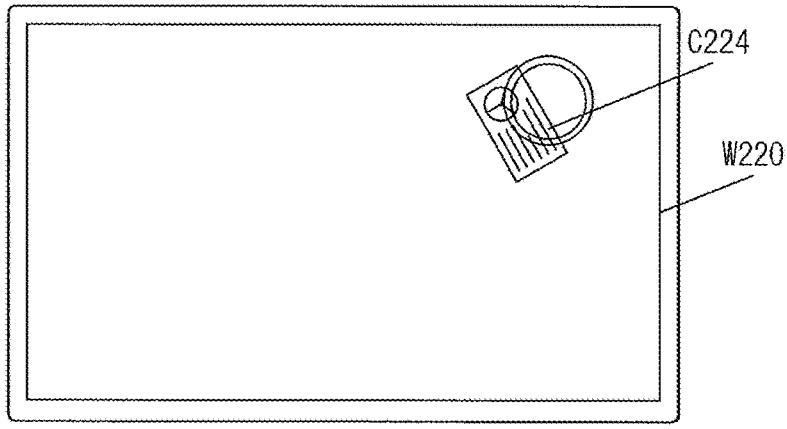
Figure 12D:
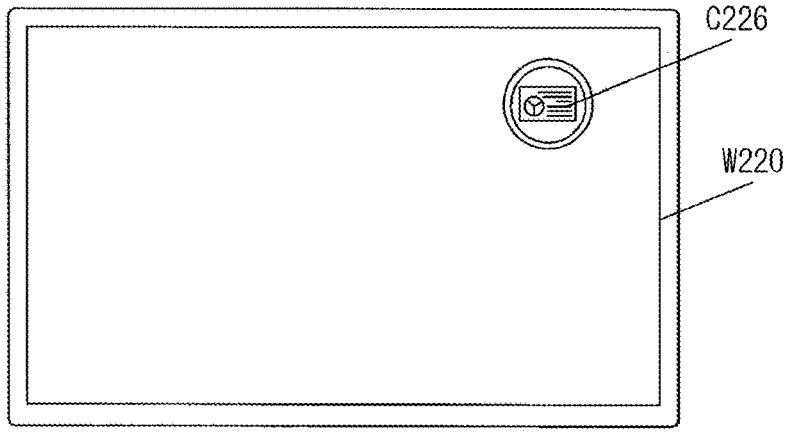

On a display screen W220 in FIGS. 12A to 12D, a sheet is displayed as if the sheet is taken into the tunnel tray while rotating. For example, as illustrated in FIG. 12A, a sheet C220 is displayed on a tunnel tray T220. At that time, when the selection is released (a touch up operation is performed), the content corresponding to the sheet is transmitted to the shared folder.

At that time, the sheet C220 is displayed so as to be gradually reduced in size while gradually rotating to the center of the tunnel tray T220. FIGS. 12A to 12D illustrate a sheet C222 in FIG. 12B, a sheet C224 in FIG. 12C, and a sheet C226 in FIG. 12D, from which it is found that the sheet is gradually reduced in size while rotating. Thus, a user views the state as if the sheet is taken into the tunnel tray. This enables the user to have a clear image indicating that content is being transmitted. Also in this case, it is preferable that a sheet be reduced in size at least until the sheet is accommodated in the tunnel tray.

Thus, according to the second embodiment, a user may have a view image as if a sheet is thrown into the tunnel tray and the thrown sheet is taken into a tunnel. This enables a user to confirm the intuitive effect that the content has been transmitted.

In addition, a sheet is reduced in size at least to such a degree that the sheet is accommodated in the tunnel tray. Thus, a user may feel as if the sheet is taken into a tunnel, and may confirm transmission of the sheet with an intuitive image indicating that the content corresponding to the sheet is being transmitted.

In addition to reduction in size of a sheet, the display form may be changed so that the sheet is made transparent. For example, an increase in transparency in accordance with the reduction in size enables the sheet to be displayed in a manner that the sheet gradually disappears.

Ideally, a sheet is accommodated in the tunnel tray. However, the point is that the size of a sheet reduced in size approaches the size of the tunnel tray. Therefore, a sheet larger than the tunnel tray does not lead to elimination of all of the effects.

Third Embodiment

A third embodiment will be described. In the third embodiment, a user may recognize, with high visibility, a sheet having been moved to a position near the tunnel tray in step S114 in FIG. 5 according to the first embodiment. The functional configuration of the apparatuses according to the third embodiment is the same as that according to the first embodiment. The process flows according to the third embodiment are also the same as those according to the first embodiment.

Figure 13A:
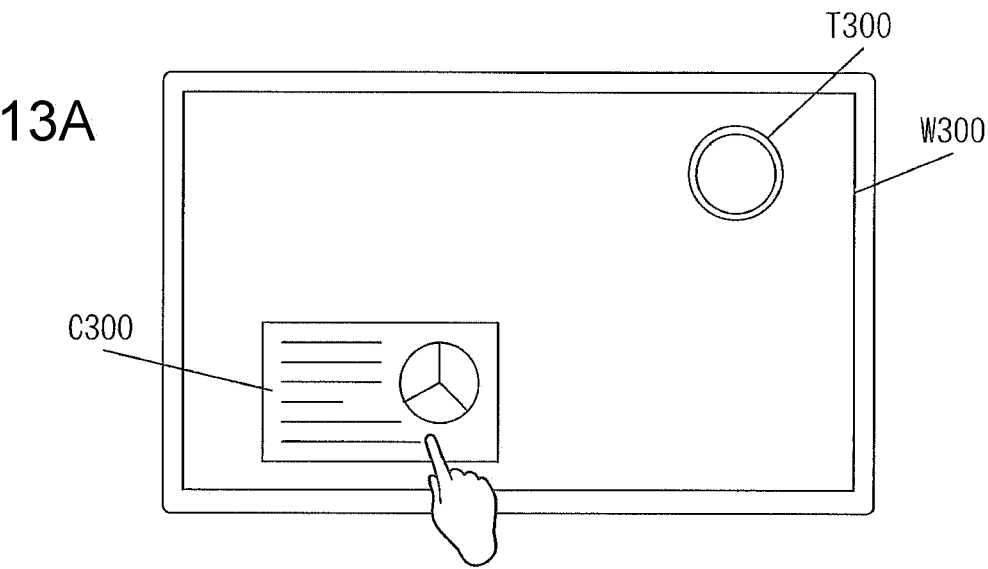
FIGS. 13A to 13C are diagrams for describing an exemplary operation according to a third embodiment.

As illustrated on a display screen W300 in FIG. 13A, a user performs a touch down operation on a sheet C300 so as to select the sheet, and performs a move operation on the sheet in the direction to a tunnel tray T300. When the sheet C300 is located near the tunnel tray T300, the display form of the sheet C300 is changed.

Figure 13B:
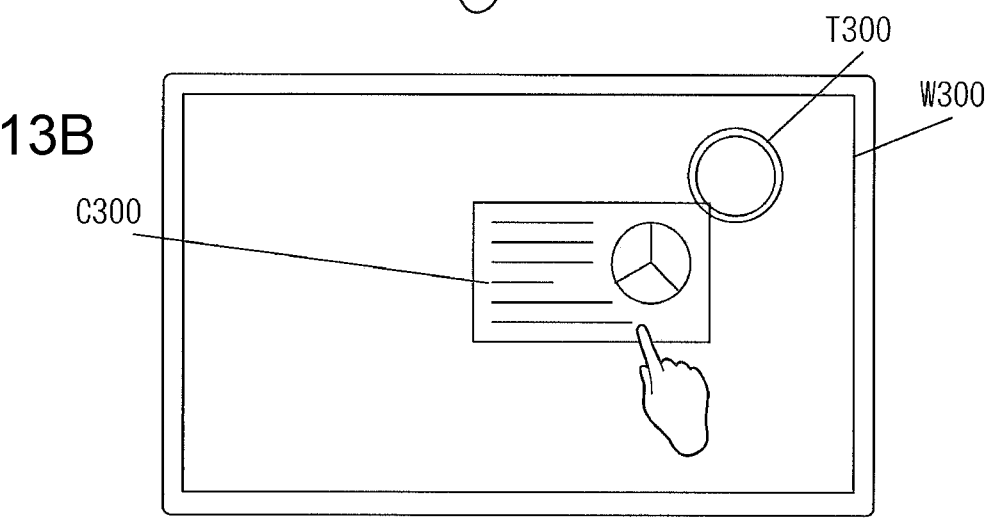
Figure 13C:
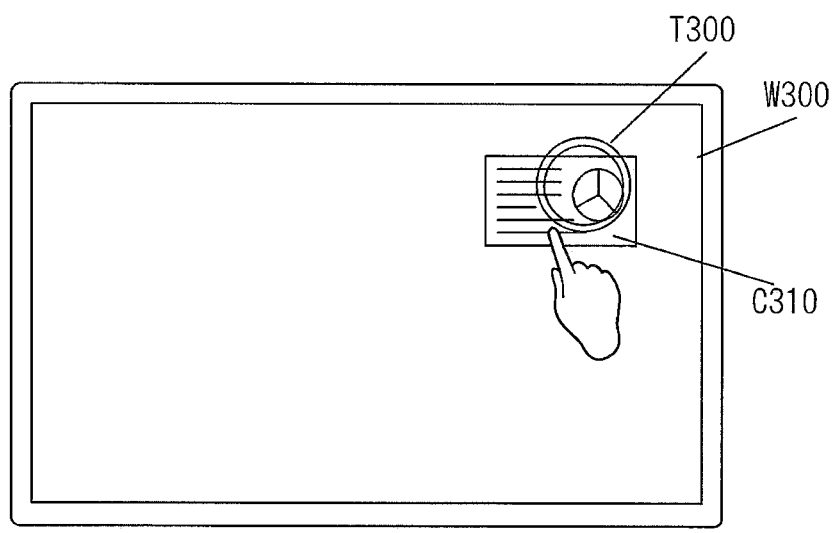

In the third embodiment, as illustrated in FIG. 13B, when the sheet is located far from the tunnel tray T300, the display is not changed. As illustrated in FIG. 13C, when the sheet is located near the tunnel tray T300, a sheet C310 is displayed so as to be reduced in size. Thus, when a user performs a touch up operation so as to release the selection, the user may recognize, with high visibility, transmission of the content, which corresponds to the sheet C310, to the shared folder, that is, the display apparatus 10.

FIGS. 13A to 13C illustrate a changing display form in which the size is reduced. However, the display form may be changed in another way. For example, a changing display form, such as transparency display, blinking display, or display with an increase in the brightness, may be employed. In addition, various types of notification, such as balloon display, audio output, and alert sound output, may be performed.

According to the third embodiment, a selected sheet approaching the tunnel tray causes the display form of the sheet to be changed, or causes notification to be performed. Thus, a user may clearly recognize that the sheet that is currently being moved is to be transmitted to the display apparatus 10.

Fourth Embodiment

A fourth embodiment will be described. In the fourth embodiment, a user may recognize, with high visibility, a sheet having been moved to a position near the tunnel tray in step S114 in FIG. 5 according to the first embodiment. The functional configuration of the apparatuses according to the fourth embodiment is the same as that according to the first embodiment. The process flows according to the fourth embodiment are also the same as those according to the first embodiment.

Figure 14A:
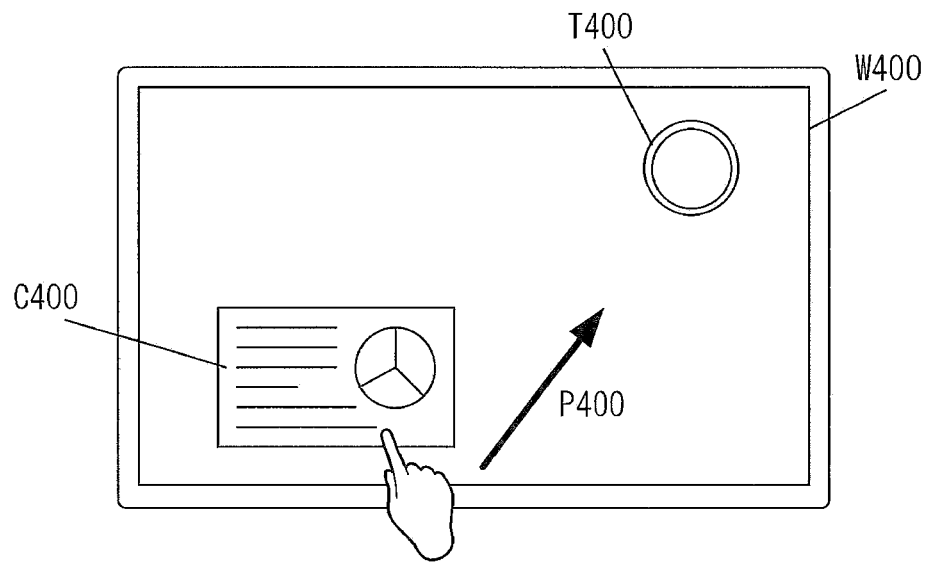
FIGS. 14A and 14B are diagrams for describing an exemplary operation according to a fourth embodiment.

As illustrated in a display screen W400 in FIG. 14A, a user performs a touch down operation on a sheet C400 so as to select the sheet C400, and performs a move operation on the sheet C400 in the direction to a tunnel tray T400. When the sheet C400 is located near the tunnel tray T400, the display form of the tunnel tray T400 is changed.

Figure 14B:
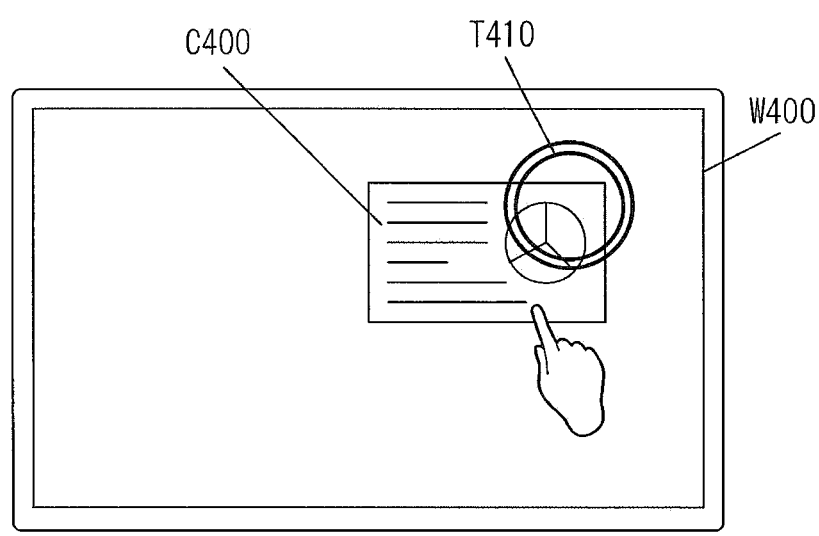

In the fourth embodiment, as illustrated in FIG. 14B, since the sheet C400 is located near the tunnel tray, a tunnel tray T410 whose tunnel tray form has been changed is displayed. Examples of the change of the display form of the tunnel tray include an increase in size as illustrated in FIG. 14B, and bold display. In addition to these, various display forms, such as change in the transparency, change in the color, and blinking display, may be employed.

Thus, according to the fourth embodiment, a selected sheet approaching the tunnel tray causes the display form of the tunnel tray to be changed. Thus, a user may clearly recognize that the sheet that is currently being moved has reached the tunnel tray, that is, that the content corresponding to the sheet that is being moved is to be transmitted to the display apparatus 10 if the user performs a touch up operation in that state.

Fifth Embodiment

A fifth embodiment will be described. The fifth embodiment describes the case in which the display apparatus 10 fails to display or play content having been transmitted from the terminal apparatus 20, that is, the case in which the display apparatus 10 does not support the content. The functional configuration of the apparatuses according to the fifth embodiment is the same as that according to the first embodiment.

Not-supported content indicates a file which fails to be displayed, played, or edited appropriately by the display apparatus 10. For example, this corresponds the case in which no applications for displaying the content have been installed in the display apparatus 10, or the case in which a codec for displaying or playing the content has not been installed.

Figure 7:
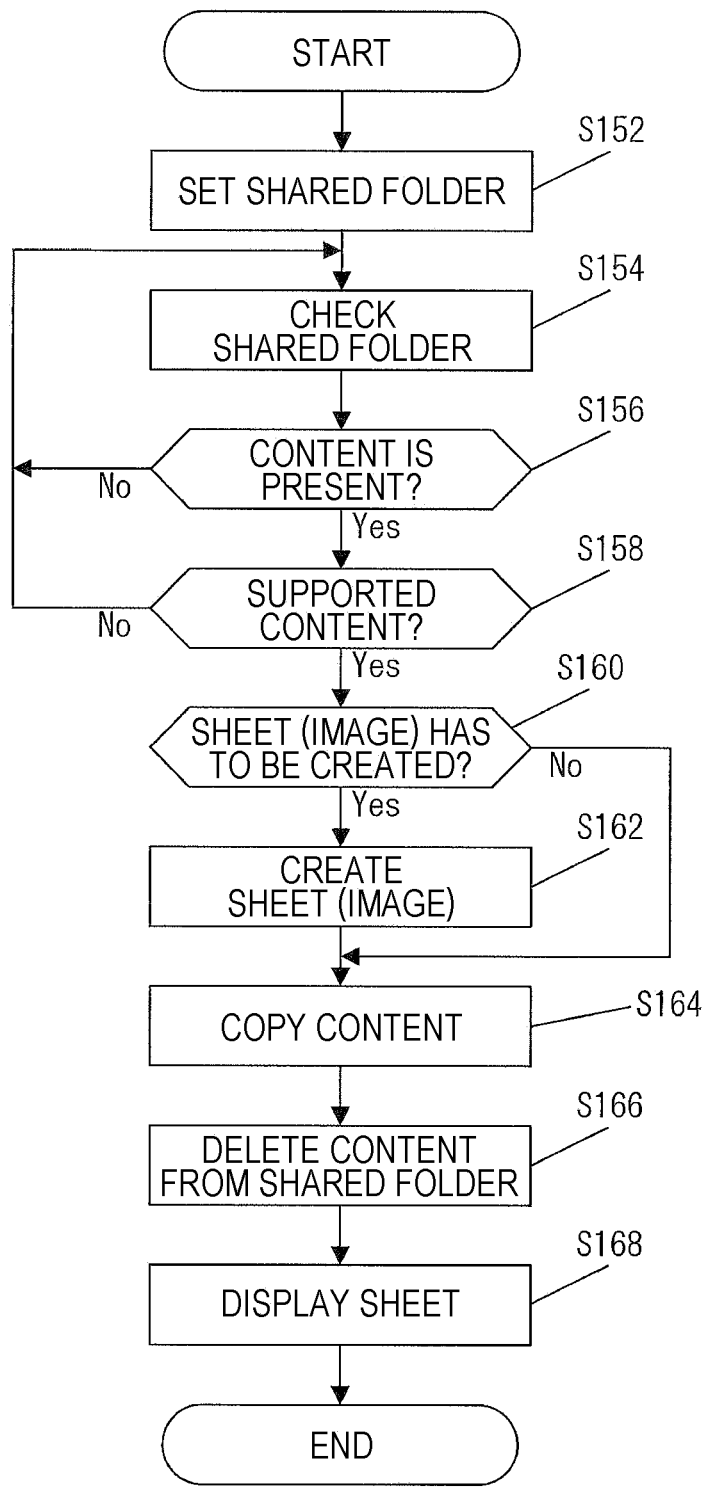
FIG. 7 is a flowchart for describing a process performed by a display apparatus according to the first embodiment.
Figure 15:
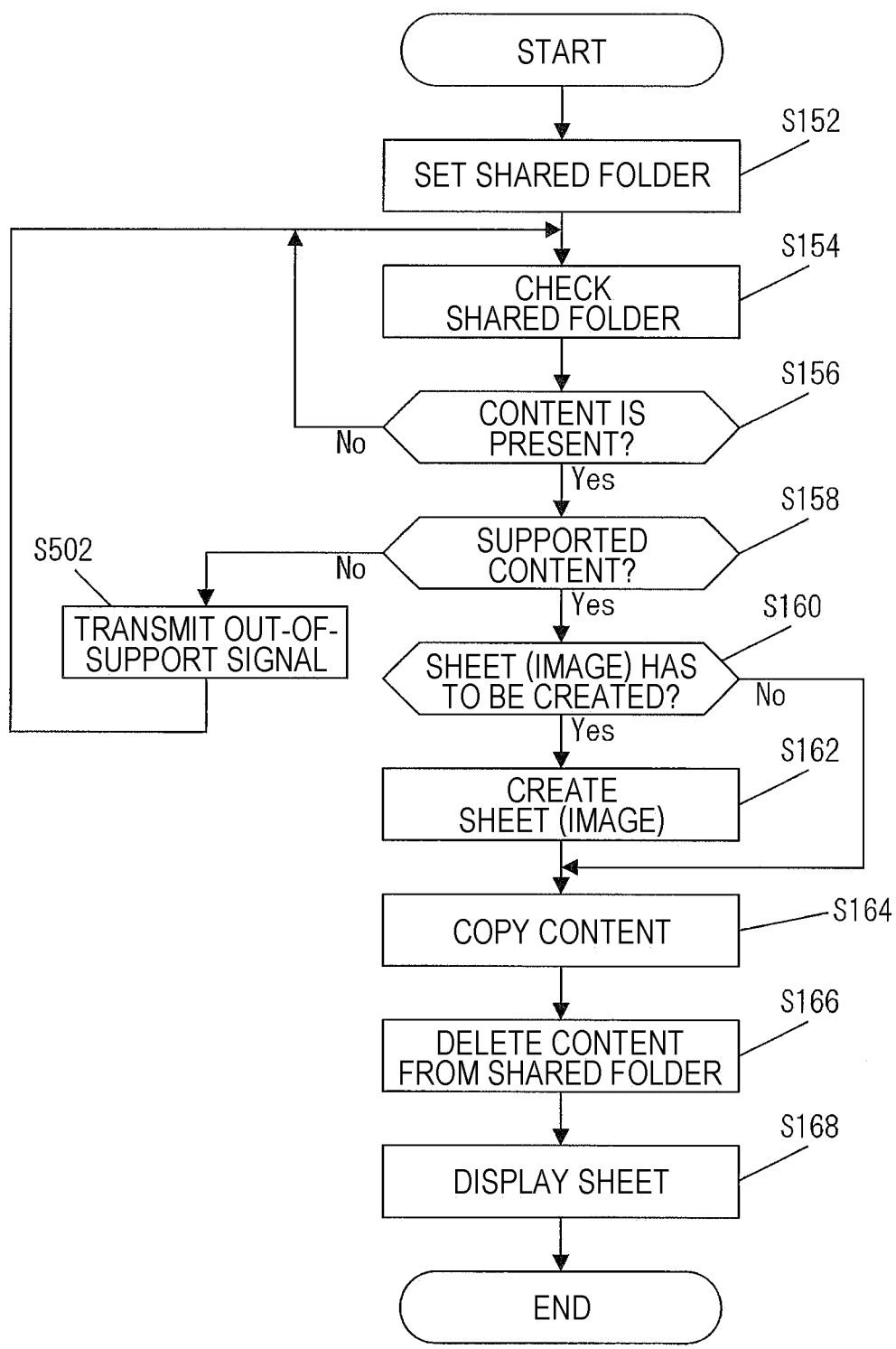
FIG. 15 is a flowchart for describing a process performed by a display apparatus according to a fifth embodiment.

The process flow in FIG. 7 according to the first embodiment is replaced with that in FIG. 15. Identical processes in the process flow are designated with identical reference characters, and will not be described.

That is, in FIG. 7, if not-supported content is stored in the shared folder, the display apparatus 10 performs the processes while ignoring the file. In the fifth embodiment, if not-supported content is stored (No in step S158), the display apparatus 10 transmits, to the terminal apparatus 20 which has stored the content, an out-of-support signal that indicates that the content is not supported (step S502 from the No branch of step S158).

Figure 16:
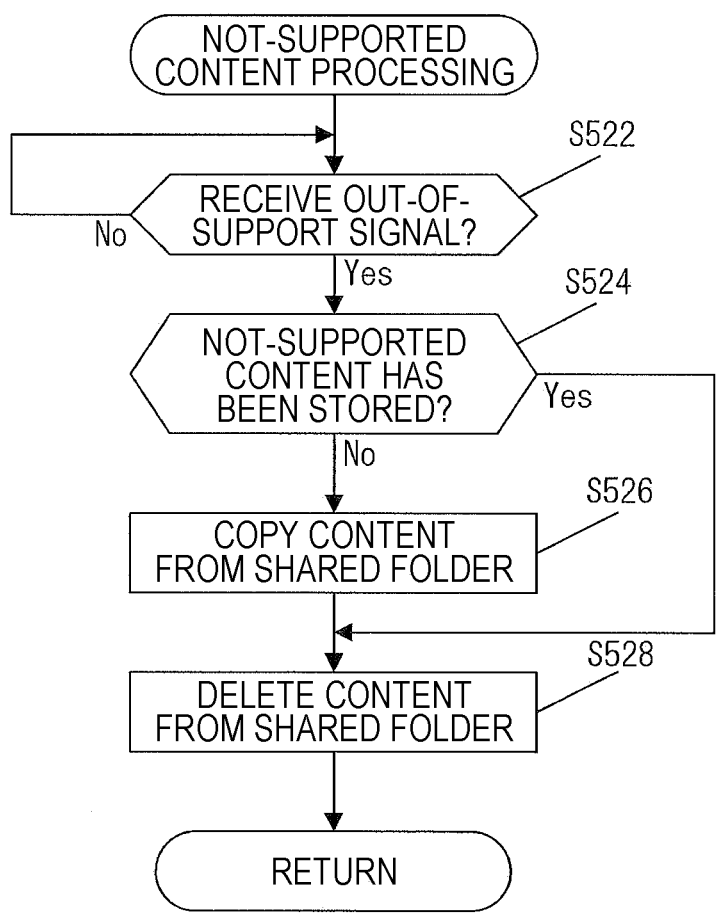
FIG. 16 is a flowchart for describing a process performed by a terminal apparatus according to the fifth embodiment.

FIG. 16 illustrates a process performed by the terminal apparatus 20. If the terminal apparatus 20 receives an out-of-support signal from the display apparatus 10 (Yes in step S522), the terminal apparatus 20 checks if the not-supported content has been stored in the terminal apparatus 20 (step S524). If the content has not been stored in the terminal apparatus 20 due to a move operation or the like, the terminal apparatus 20 may copy again the content from the shared folder to the terminal apparatus 20 (step S526 from the No branch of step S524).

Then, the terminal apparatus 20 deletes the unnecessary content stored in the shared folder (step S528). The not-supported content may be deleted as in the fifth embodiment, or may be still stored until a user deletes the content.

In step S522, if the terminal apparatus 20 receives an out-of-support signal, the terminal apparatus 20 may notify a user of a message about this, for example, through display of the message on the display unit 210, output of audio guidance information, or alert sound output.

Figure 17A:
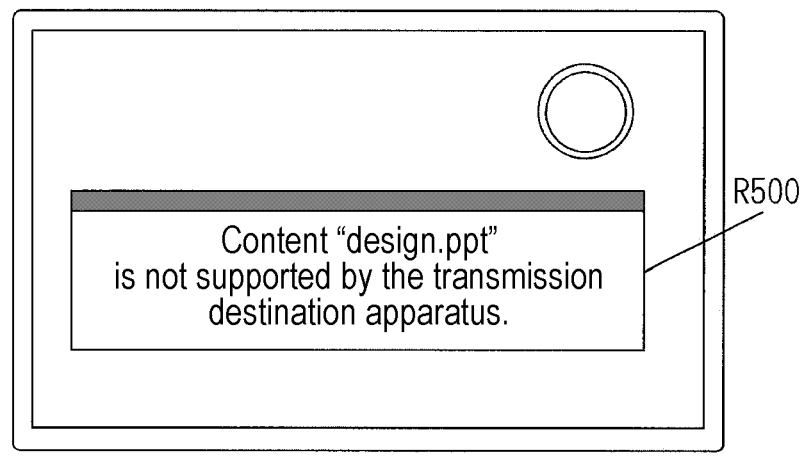
FIGS. 17A and 17B are diagrams for describing an exemplary operation according to the fifth embodiment.
Figure 17B:
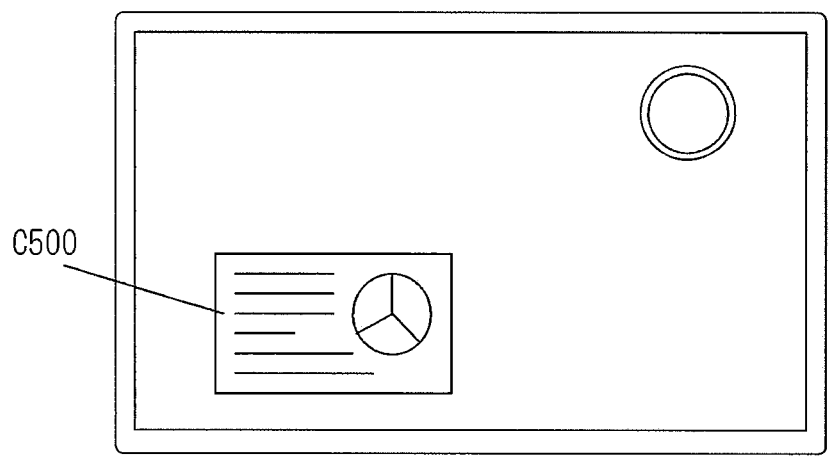

An exemplary operation according to the fifth embodiment will be described by referring to FIGS. 17A and 17B. FIG. 17A illustrates a notification screen (alert screen) displayed in the case where the terminal apparatus 20 has transmitted content to the display apparatus 10 and where the display apparatus 10, which is a transmission destination apparatus, does not support the content.

In this case, through display of a message in an area R500, it is found that the display apparatus does not support the content. As illustrated in FIG. 17B, if a sheet has been deleted once, the deleted sheet may be recovered as a sheet C500. That is, even if the content corresponding to the sheet has been deleted once, when an out-of-support signal is received, the content may be copied to the terminal apparatus 20 again.

Sixth Embodiment

A sixth embodiment will be described. The sixth embodiment describes the case in which, when the display apparatus 10 does not support content to be transmitted, the content is converted into supported content for transmission. The functional configuration of the apparatuses according to the sixth embodiment is the same as that according to the first embodiment.

Figure 18:
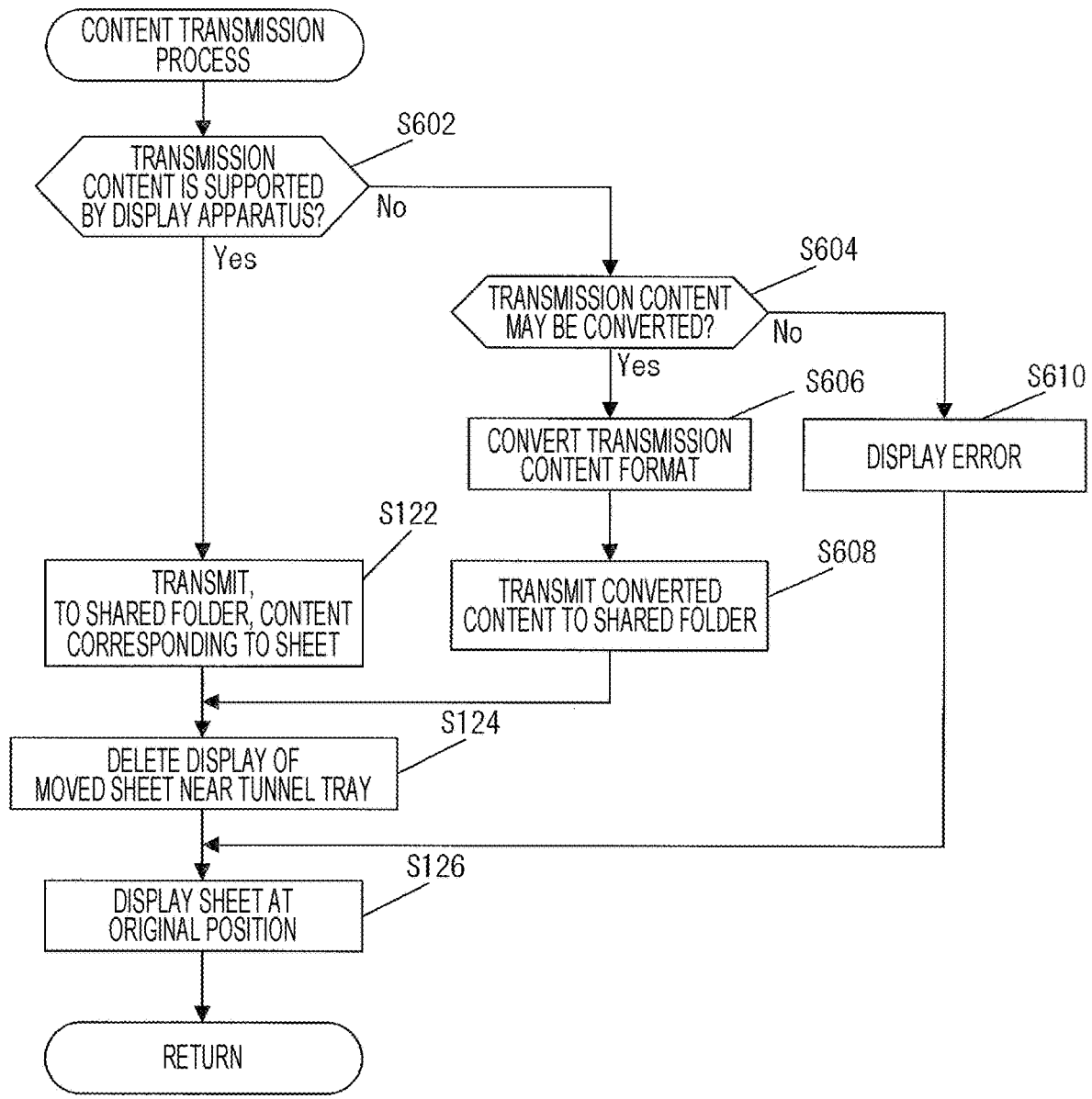
FIG. 18 is a flowchart for describing a transmission process performed by a terminal apparatus according to a sixth embodiment.

The process flow in FIG. 6 according to the first embodiment is replaced with that in FIG. 18. Identical processes in the process flow are designated with identical reference characters, and will not be described.

In execution of the content transmission process, the terminal apparatus 20 determines whether or not the content to be transmitted is supported by the display apparatus 10 which is the transmission destination (step S602). Various methods may be used as the method of determining whether or not the content is supported by the display apparatus 10.

(1) A database describing support information of the display apparatus 10 is stored in the terminal apparatus 20. When the terminal apparatus 20 is to transmit content, the terminal apparatus 20 checks, based on the database, if the display apparatus 10 supports the content.

(2) When the terminal apparatus 20 is to transmit content, the terminal apparatus 20 asks the display apparatus 10 if the display apparatus 10 supports the content. The terminal apparatus 20 determines, in accordance with the answer, whether or not the content is supported. The database may be updated based on the determination result.

By using these methods, if the terminal apparatus 20 determines that the display apparatus 10 supports the content (Yes in step S602), steps S122, S124, and S126 are performed.

In contrast, if the display apparatus 10 does not support the content, the terminal apparatus 20 determines whether or not the terminal apparatus 20 is capable of converting the content, which is to be transmitted, into content that is capable of being displayed or played by the display apparatus 10 (step S604).

If the terminal apparatus 20 is capable of converting the content, which is to be transmitted, into content supported by the display apparatus 10 (Yes in step S604), the terminal apparatus 20 converts the format of the content to be transmitted (step S606), and transmits, to the shared folder, the content obtained through the conversion (step S608). Specifically, for example, the content may be converted into a PDF file or an image file, may be converted into moving image data that may be played, or may be converted into audio data that may be output.

In contrast, if the terminal apparatus 20 is not capable of converting the content, which is to be transmitted, into a content format supported by the display apparatus 10, the terminal apparatus 20 displays an error message (step S610 from the No branch of step S604), and ends the process without transmitting the content.

Thus, according to the sixth embodiment, even content that is not supported by the display apparatus 10 may be, for example, displayed appropriately.

In the sixth embodiment, the terminal apparatus 20 converts content, which is to be transmitted, into a supported format. However, for example, the shared server 30 may perform the conversion. For example, in the stage in which content is stored in the shared folder, the shared server 30 determines whether or not the display apparatus 10 which is a transmission destination supports the content. If the display apparatus 10 does not support the content, the shared server 30 may convert the format into supported content and store the resulting content.

In this case, for example, content may be converted into a widely compatible content format, such as a PDF file or a JPEG file.

Seventh Embodiment

A seventh embodiment will be described. The seventh embodiment describes the case in which multiple pieces of content are selected for transmission. The functional configuration of the apparatuses according to the seventh embodiment is the same as that according to the first embodiment.

Figure 19:
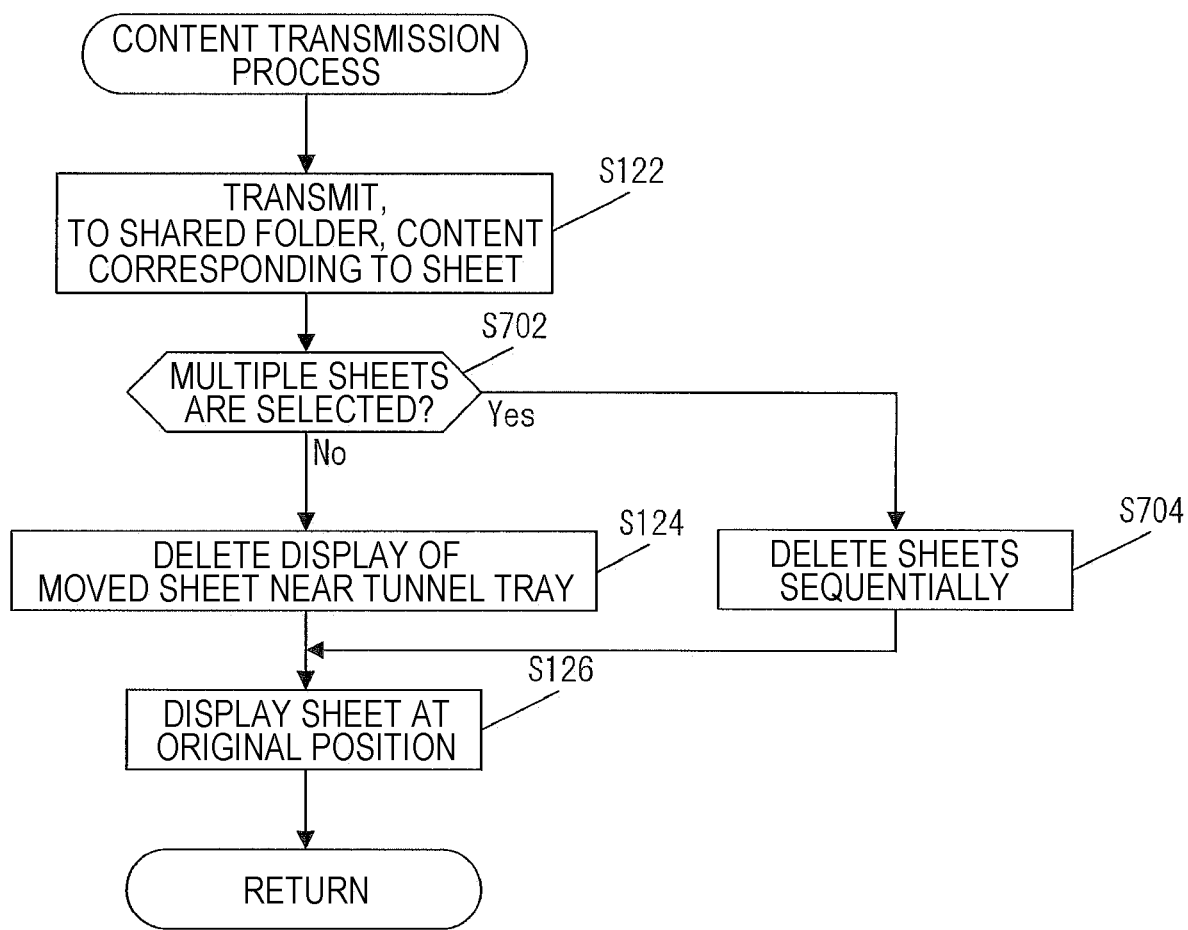
FIG. 19 is a flowchart for describing a transmission process performed by a terminal apparatus according to a seventh embodiment.

The process flow in FIG. 6 according to the first embodiment is replaced with that in FIG. 19. Identical processes in the process flow are designated with identical reference characters, and will not be described.

In the seventh embodiment, multiple sheets displayed in the work area may be selected. Multiple sheets may be selected with sequential taps or a multi-touch operation. Alternatively, the mode may be switched to the multi-selection mode. Multiple sheets may be selected as a set of sheets (a set of displayed images).

If multiple sheets are selected, that is, if a set of sheets is selected (No in step S702), the display form is changed sequentially on the sheets included in the set of sheets. In the seventh embodiment, sheets having been moved onto the tunnel tray are sequentially deleted (step S704). The pieces of content to be transmitted to the shared folder may be sequentially transmitted, or may be transmitted at the same time.

Various display methods may be used in sequential deletion of sheets. For example, the sheets are deleted by using the following display method.

(1) First, the nth sheet (the initial value of n is 1) is displayed as a sheet displayed at the sheet coordinates before move.

(2) Subsequently, the nth sheet is displayed with a reduced sheet size.

(3) The nth sheet is displayed with an increase of the transparency.

(4) The nth sheet is moved so that the position of the nth sheet approaches the center of the tunnel tray, and the nth sheet is displayed.

(5) If the center coordinates of the nth sheet is not located in the tunnel tray, the processes from (2) are repeatedly performed.

(6) If the center coordinates of the nth sheet is located in the tunnel tray, the terminal apparatus 20 checks if all of the sheets have been displayed. If all of the sheets have not been displayed, n is incremented, and the processes are repeatedly performed from the first process.

Thus, multiple sheets may be displayed as if the multiple sheets are sequentially taken into the tunnel tray. At that time, the sheets may be displayed one by one, or may be continually displayed. That is, after deletion of the nth sheet, the display of the (n+1)th sheet may be changed. Alternatively, both of the sheets may be processed whenever appropriate.

In the seventh embodiment, the description is made by taking, as an example, the number of sheets (the number of pieces of content). A similar process may be performed on the pages in content corresponding to a sheet. That is, when content, such as a document file, corresponding to a sheet is constituted by multiple pages, a sheet may be created for each page, and the display form may be similarly changed as if the sheet is taken into the tunnel tray.

Figure 20A:
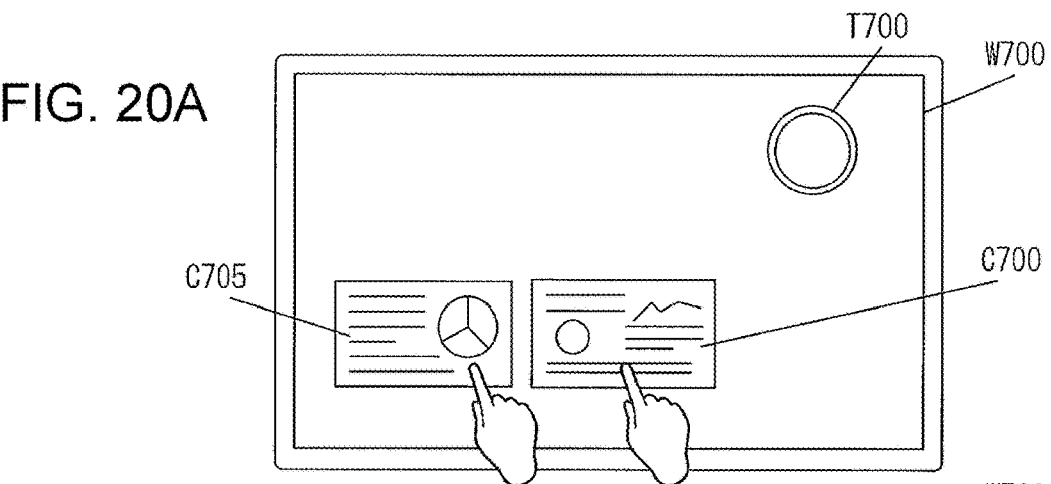
FIGS. 20A to 20D are diagrams for describing an exemplary operation according to the seventh embodiment.
Figure 20B:
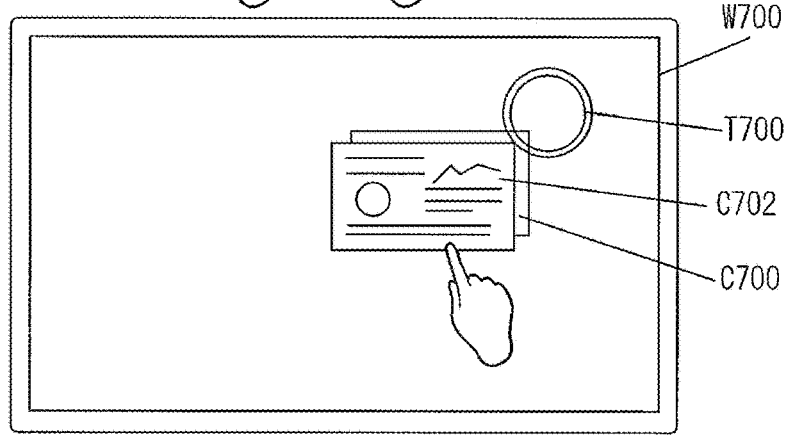

FIGS. 20A to 20D are diagrams for describing an exemplary operation according to the seventh embodiment. As illustrated in FIG. 20A, a sheet C700 and a sheet C705 are displayed on a display screen W700. A user selects both of the sheets, and moves the sheets, as a set, to a tunnel tray T700 as illustrated in FIG. 20B.

Figure 20C:
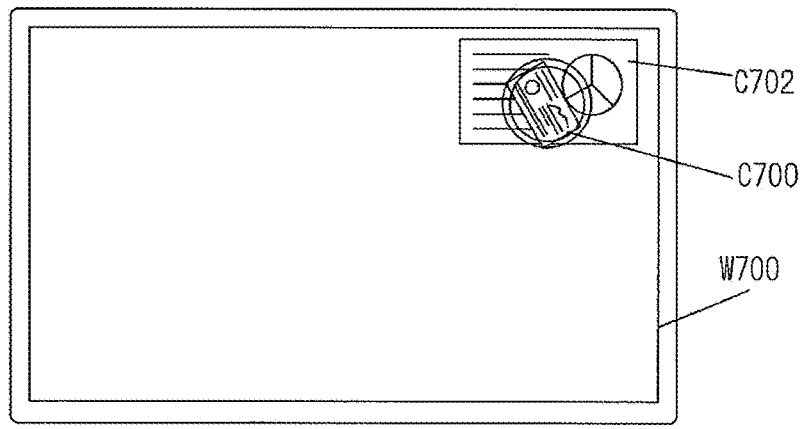

FIG. 20C is a diagram illustrating the state in which a touch up operation is performed on the tunnel tray T700. FIG. 20C illustrates the state in which, while rotating, the sheet C700 is gradually reduced in size. At that time, the display form of a sheet C702 is not changed.

Figure 20D:
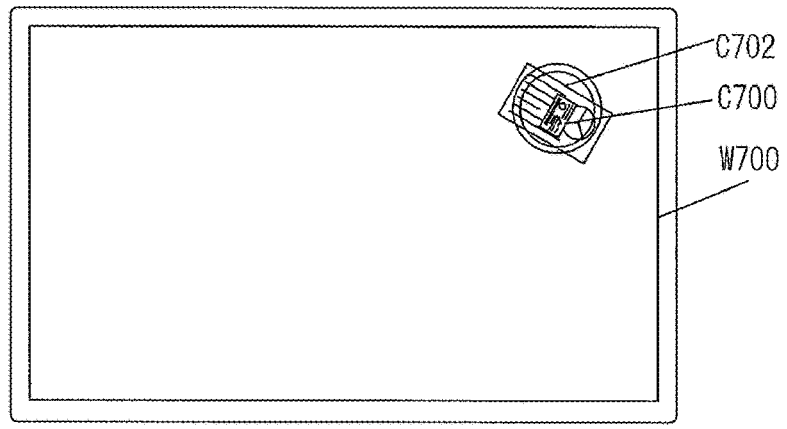

Then, after the display form of the sheet C700 has been changed to a certain degree, the display form of the sheet C702 is changed. FIG. 20D illustrates the state in which, while rotating, the sheet C702 is also gradually reduced in size. However, the sheet C700 is smaller than the sheet C702. In this case, after the sheet C700 has been deleted, the rotation or the like of the sheet C702 may be displayed.

Eighth Embodiment

An eighth embodiment will be described. The eighth embodiment describes the case in which the terminal apparatus 20 is connected to multiple display apparatuses. The functional configuration of the apparatuses according to the eighth embodiment is the same as that according to the first embodiment. The process flows according to the eighth embodiment are also the same as those according to the first embodiment.

That is, the shared folder is set in the shared folder setting information. In the eighth embodiment, a corresponding shared folder is set for each tunnel tray.

Thus, multiple shared folders may be set. This enables the terminal apparatus 20 to switch between display apparatuses in accordance with settings of shared folders.

Figure 21A:
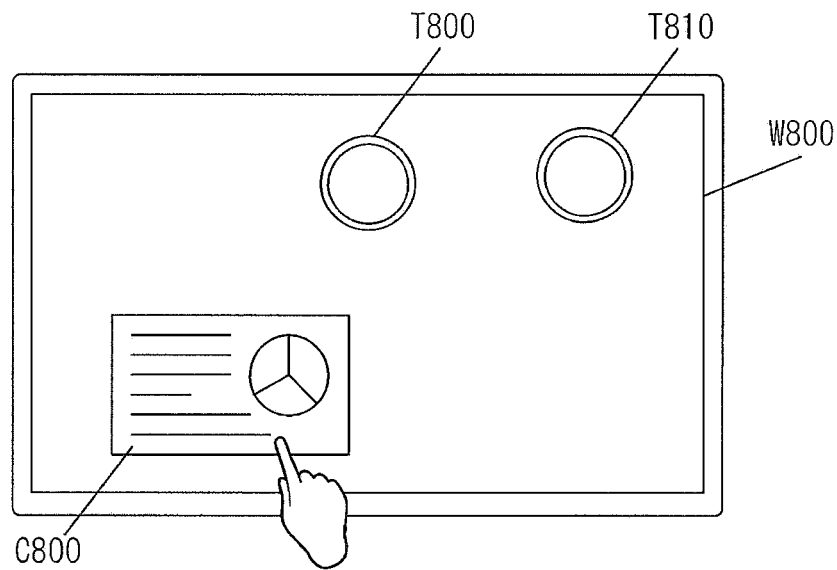
FIGS. 21A to 21C are diagrams for describing an exemplary operation according to an eighth embodiment.
Figure 21B:
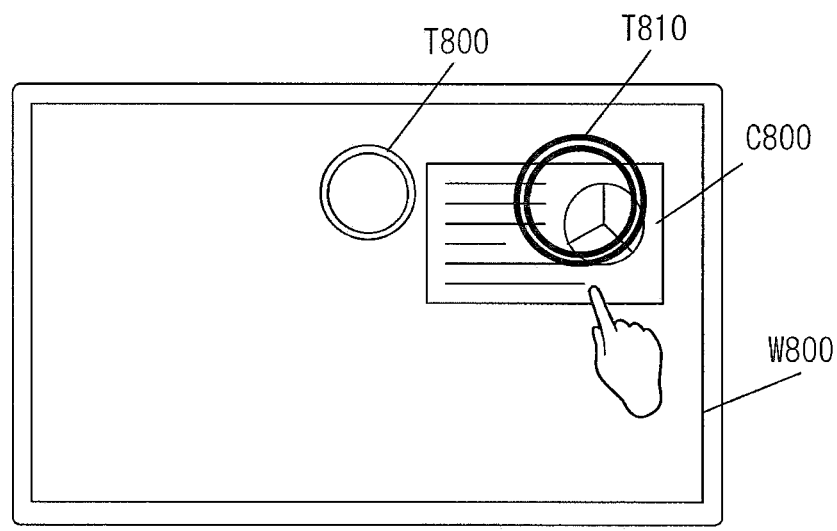
Figure 21C:
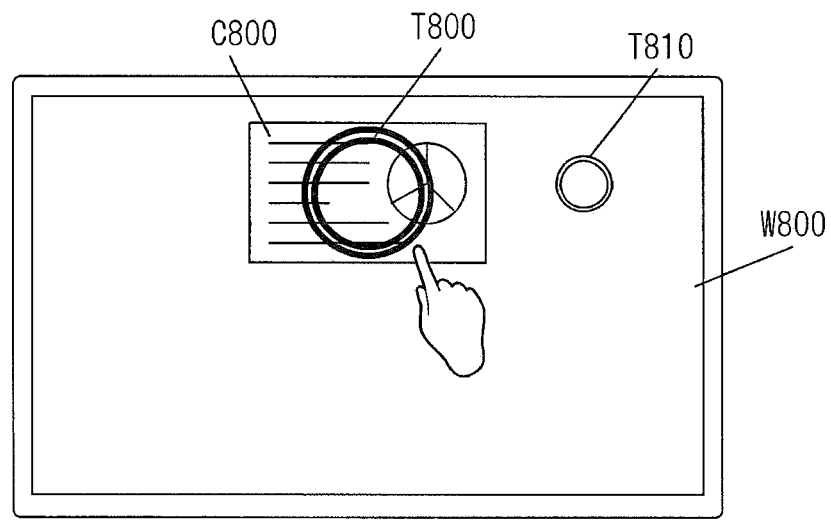

FIGS. 21A to 21C are diagrams for describing an exemplary operation according to the eighth embodiment. In FIG. 21A, a tunnel tray T800 and a tunnel tray T810 are displayed on a display screen W800. Different shared folders are set to the tunnel trays. Thus, for example, the shared folder which is set to the tunnel tray T800 is assigned to a first display apparatus. The shared folder which is set to the tunnel tray T810 is assigned to a second display apparatus.

FIG. 21B illustrates the state in which the display of a sheet C800 has moved to the tunnel tray T810. The display form of the tunnel tray is changed so that selection of the tunnel tray T810 is indicated.

Examples of change in the display form of a tunnel tray include change in the frame thickness and change in the color. As illustrated in FIG. 21C, the size may be changed.

As illustrated in FIG. 21C, the tunnel tray T800 which is being used may be enlarged. Conversely, the tunnel tray T810 may be reduced in size. Thus, a combination of multiple types of display form may be changed, or a single type of display form may be changed. The state illustrated in FIG. 21C is exemplary. Both of the tunnel trays are not necessarily changed in size. When the size is changed, the frame thickness may remain the same.

Ninth Embodiment

A ninth embodiment will be described. The ninth embodiment describes the case in which the terminal apparatus 20 is connected to multiple display apparatuses. The functional configuration of the apparatuses according to the ninth embodiment is the same as that according to the eighth embodiment. The process flows according to the ninth embodiment are also the same as those according to the eighth embodiment.

In the eighth embodiment, a corresponding tunnel tray is displayed for each display apparatus (each shared folder). In the ninth embodiment, the case in which multiple shared folders are set to a single tunnel tray will be described.

Specifically, pieces of user identification information are stored in the shared folder setting information in accordance with settings of the shared folders. Examples of user identification information include specific identification information obtained from an electronic pen with which the operation detecting unit 120 detects an operation. Each piece of specific identification information is stored in association with a corresponding shared folder (display apparatus).

In this case, for example, when a sheet is moved to the tunnel tray by using a first electronic pen, the content corresponding to the sheet is transmitted to the first display apparatus. When a sheet is moved to the tunnel tray by using a second electronic pen, the content corresponding to the sheet is transmitted to the second display apparatus.

Thus, use of other identification information enables transmission of content to multiple display apparatuses (shared folders) even when only one tunnel tray is present. In the ninth embodiment, identification information of an electronic pen is used as user identification information. Alternatively, other identification information may be used, or identification information may be switched depending on an operation. For example, a single touch operation may indicate the first display apparatus, and a double touch operation may indicate the second display apparatus.

Tenth Embodiment

A tenth embodiment will be described. The tenth embodiment describes the case in which transmission of content is canceled.

That is, in the embodiments described above, when content is transmitted in step S124 or the like, the display form indicating that the sheet is being deleted is displayed. For example, by tapping this display form, transmission of content may be canceled (stopped).

For example, in FIGS. 12A to 12D according to the second embodiment, a sheet is rotated and reduced in size. At that time, by tapping the sheet or the tunnel tray, the transmission process may be canceled.

Therefore, when a user recognizes that the user has commanded transmission of unintended content, the transmission of content may be stopped with an easy operation.

Application Examples

Application of the content delivery system providing the embodiments described above may cause effective use in the following cases.

1. In the case where a table-type display apparatus is used as the terminal apparatus and where a vertically-oriented display apparatus is used as the display apparatus, opinions may be effectively exchanged and shared in an electronic conference or the like.

(1) People write their opinions on their memo sheets by using the terminal apparatus (table-type display apparatus).

(2) The memo sheets on which the opinions are written are displayed on the display apparatus (vertically-oriented display apparatus).

When it is considered that the process flow from (1) to (2) is to be smoothly performed, the related-art drawer, which is disposed on one of the sides, is not suitable. Instead of the drawer, the tunnel tray is disposed at the center in consideration of operations from the four sides that are characteristics of the table-type display, enhancing convenience for users.

2. A table-type display apparatus may be used as the terminal apparatus, which serves as a transmission source, in the lobby of a hotel. In this case, documents, content, and photographs may be easily shared.

(1) People display (transfer) photographs and moving images to the terminal apparatus (table-type display apparatus) which serves as a transmission source.

(2) A display apparatus (a smartphone of each person or a folder of an external storage server), which serves as a reception source, is set to a corresponding tunnel tray.

(3) A person inputs content, which the person wants, to the person's tunnel tray.

(4) A person inputs content, which a different person wants, to the different person's tunnel tray.

(5) A reception operation is performed to receive the content.

When it is considered that the process flow from (3) to (4) is to be smoothly performed, the content delivery system is effectively applied since the tunnel tray is movable.

3. The content delivery system may be used in a meeting. In this case, documents and content may be easily classified.

(1) Documents are displayed in a meeting on the terminal apparatus, which serves as a transmission source.

(2) In addition to the drawer of the related art, a "to-be-checked folder" is set to the tunnel tray.

(3) Sheets which are recognized as to-be-checked documents in the meeting are input to the tunnel tray.

(4) After the meeting, the participants check the to-be-checked documents at their desks.

By using the tunnel tray, specific documents are classified, for management, from a large number of documents, and the process flow from (3) to (4) may be smoothly performed. In this case, it is assume that a corresponding drawer of the related art is prepared and used for each meeting. For a different type of operation, such as an operation of "checking documents later", the tunnel tray may be used as a storage different from the drawer of the related art.

Modified Examples

The embodiments provided by the present disclosure are described above in detail by referring to the drawings. The specific configuration is not limited to the embodiments. Design and the like made without departing from the gist of the present disclosure are also encompassed in the claims.

In the embodiments described above, the example in which a touch panel is used as the operation detecting unit and in which a touch operation (tap operation) is performed is described. Alternatively, for example, an external input apparatus such as a mouse may be used to perform operations using a click operation and the like.

The embodiments describe the example in which a touch panel formed of the display unit 110 and the operation detecting unit 120 combined with each other is used. As a matter of course, to embody the present disclosure disclosed by using the embodiments, another scheme may be employed. For example, a projector may be used as the display unit 110, and a person detecting sensor may be used as the operation detecting unit 120. By connecting a control computer to the operation detecting unit 120 and the display unit 110, the content delivery system may be implemented as a display system.

For the sake of convenience of explanation, some of the embodiments described above are separately described. As a matter of course, some of the embodiments may be combined for implementation in a technically allowable range. For example, the operation according to the fifth embodiment may be combined with other embodiments for implementation.

Thus, the embodiments described in the specification may be combined with each other for implementation in a range in which no contradiction occurs.

Programs running in the apparatuses in the embodiments are programs for controlling a CPU and the like so that the above-described functions according to the embodiments are implemented (programs for causing a computer to function). Information used in these apparatuses is temporarily accumulated in a temporary storage (for example, a random-access memory (RAM)) during processing, and is then stored in various storage devices, such as a read-only memory (ROM), an HDD, and an SSD. When appropriate, the CPU reads, modifies, and writes the information.

When the programs are distributed in a market, the programs may be stored in a portable storage medium for distribution, or may be transferred to a server computer connected over a network such as the Internet. In this case, as a matter of course, the present disclosure encompasses a storage device of the server computer.

The present disclosure contains subject matter related to that disclosed in Japanese Priority Patent Application JP 2017-120698 filed in the Japan Patent Office on Jun. 20, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
a display that displays an image on a display screen, the image being created based on content;
selection circuitry that selects a selected image from the image;
detection circuitry that detects a move operation on the selected image;
determination circuitry that determines whether or not the selected image has been moved to a predetermined specified area on the display screen;
changing circuitry that changes a display form of the selected image when the selected image has been moved to the specified area; and transmission circuitry that transmits content to a transmission destination, the content corresponding to the selected image whose display form has been changed, the transmission destination being associated with the specified area, wherein when the display displays a transmission icon, and the selected image has been moved to a position near the specified area, the changing circuitry changes a display form of the transmission icon, and the transmission circuitry transmits the content to the transmission destination when the display form of the transmission icon is changed.

2. The display apparatus according to claim 1, wherein the changing circuitry changes the display form by reducing the selected image in size, the reduction in size being performed in such a manner that the selected image is accommodated in the specified area.

3. The display apparatus according to claim 2, wherein the changing circuitry changes the display form by rotating the selected image or by making the selected image transparent.

4. The display apparatus according to claim 2, wherein, when the selected image has been moved to a position near the specified area, the changing circuitry reduces the selected image in size, and, when the selection of the selected image has been released, the changing circuitry reduces the selected image in size in such a manner that the selected image is accommodated in the specified area.

5. The display apparatus according to claim 1, wherein
the selection circuitry selects a plurality of the images as an image set,
the detection circuitry detects a move operation on the image set, and
when the image set has been moved to the specified area, the changing circuitry sequentially changes the display form of each selected image included in the image set.

6. The display apparatus according to claim 1, wherein the display circuitry displays the transmission icon in the specified area.

7. The display apparatus according to claim 1, further comprising:
stop-instruction receiving circuitry that receives an instruction from a user when the changing circuitry is changing the display form of the selected image, the instruction indicating that the transmission process be stopped.

8. A non-transitory computer readable medium storing a program causing a computer to execute a process comprising:
displaying an image on a display screen, the image being created based on content;
selecting a selected image from the image;
detecting a move operation on the selected image;
determining whether or not the selected image has been moved to a predetermined specified area on the display screen;
changing a display form of the selected image when the selected image has been moved to the specified area;
transmitting content to a transmission destination, the content corresponding to the selected image whose display form has been changed, the transmission destination being associated with the specified area;
changing a display form of a transmission icon displayed on the display screen when the selected image has been moved to a position near the specified area; and
transmitting the content to the transmission destination when the display form of the transmission icon is changed.

* * * * *